(12) United States Patent
Kelly et al.

(10) Patent No.: US 11,861,975 B2
(45) Date of Patent: Jan. 2, 2024

(54) GAMING ENVIRONMENT TRACKING OPTIMIZATION

(71) Applicant: LNW Gaming, Inc., Las Vegas, NV (US)

(72) Inventors: Bryan Kelly, Kennebunk, ME (US); Martin S. Lyons, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 171 days.

(21) Appl. No.: 17/217,090

(22) Filed: Mar. 30, 2021

(65) Prior Publication Data

US 2021/0303897 A1    Sep. 30, 2021

Related U.S. Application Data

(60) Provisional application No. 63/001,941, filed on Mar. 30, 2020.

(51) Int. Cl.
| | | |
|---|---|---|
| *G06V 10/82* | (2022.01) | |
| *G06K 9/32* | (2006.01) | |
| *G07F 17/32* | (2006.01) | |
| *H04N 7/18* | (2006.01) | |
| *H04N 23/62* | (2023.01) | |
| *G06V 10/764* | (2022.01) | |
| *G06V 40/10* | (2022.01) | |

(Continued)

(52) U.S. Cl.
CPC ........ *G07F 17/3227* (2013.01); *G06V 10/764* (2022.01); *G06V 10/82* (2022.01); *G06V 40/10* (2022.01); *G06V 40/172* (2022.01); *G06V 40/20* (2022.01); *G07F 17/3206* (2013.01); *H04N 7/18* (2013.01); *H04N 23/62* (2023.01)

(58) Field of Classification Search
None
See application file for complete search history.

(56) References Cited

U.S. PATENT DOCUMENTS

| | | |
|---|---|---|
| 5,103,081 A | 4/1992 | Fisher et al. |
| 5,451,054 A | 9/1995 | Orenstein |
| 5,757,876 A | 5/1998 | Dam et al. |

(Continued)

FOREIGN PATENT DOCUMENTS

| | | | |
|---|---|---|---|
| KR | 1020160088224 A | 7/2016 | |
| WO | 2009062153 A1 | 5/2009 | |
| WO | WO-2019157288 A1 * | 8/2019 | ........... G06K 9/3241 |

OTHER PUBLICATIONS

US 10,854,041 B2, 12/2020, Shigeta (withdrawn)

(Continued)

*Primary Examiner* — Randolph I Chu

(57) ABSTRACT

A gaming system that receives a frame of image data captured by a camera at a gaming table, generates a set of images from portions of the frame of image data, and determines whether the set of images meets an input requirement of a neural network model. If the set of images does not meet the input requirement, the gaming system modifies, by an incremental amount, an image property of a subset from the set of images until the set of images meets the input requirement. When the set of images meets the input requirement, the gaming system transmits the set of images as a unit (e.g., as a composite of the set of images) to the neural network model for concurrent analysis.

17 Claims, 13 Drawing Sheets

(51) Int. Cl.
*G06V 40/16* (2022.01)
*G06V 40/20* (2022.01)

(56) References Cited

U.S. PATENT DOCUMENTS

| | | |
|---|---|---|
| 6,460,848 B1 | 10/2002 | Soltys et al. |
| 6,514,140 B1 | 2/2003 | Storch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,662 B2 | 3/2003 | Soltys et al. |
| 6,579,180 B2 | 6/2003 | Soltys et al. |
| 6,579,181 B2 | 6/2003 | Soltys et al. |
| 6,595,857 B2 | 7/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,758,751 B2 | 7/2004 | Soltys et al. |
| 7,011,309 B2 | 3/2006 | Soltys et al. |
| 7,124,947 B2 | 10/2006 | Storch |
| 7,316,615 B2 | 1/2008 | Soltys et al. |
| 7,753,781 B2 | 7/2010 | Storch |
| 7,771,272 B2 | 8/2010 | Soltys et al. |
| 8,130,097 B2 | 3/2012 | Knust et al. |
| 8,285,034 B2 | 10/2012 | Rajaraman et al. |
| 8,606,002 B2 | 12/2013 | Rajaraman et al. |
| 8,896,444 B1 | 11/2014 | Knust et al. |
| 9,165,420 B1 | 10/2015 | Knust et al. |
| 9,174,114 B1 | 11/2015 | Knust et al. |
| 9,378,605 B2 | 6/2016 | Koyama |
| 9,511,275 B1 | 12/2016 | Knust et al. |
| 9,795,870 B2 | 10/2017 | Ratliff |
| 9,811,735 B2 * | 11/2017 | Cosatto .................. G06V 20/52 |
| 9,889,371 B1 | 2/2018 | Knust et al. |
| 10,032,335 B2 | 7/2018 | Shigeta |
| 10,096,206 B2 | 10/2018 | Bulzacki et al. |
| 10,192,085 B2 | 1/2019 | Shigeta |
| 10,242,525 B1 | 3/2019 | Knust et al. |
| 10,242,527 B2 | 3/2019 | Bulzacki et al. |
| 10,304,191 B1 | 5/2019 | Mousavian et al. |
| 10,380,838 B2 | 8/2019 | Bulzacki et al. |
| 10,398,202 B2 | 9/2019 | Shigeta |
| 10,403,090 B2 | 9/2019 | Shigeta |
| 10,410,066 B2 | 9/2019 | Bulzacki et al. |
| 10,493,357 B2 | 12/2019 | Shigeta |
| 10,529,183 B2 | 1/2020 | Shigeta |
| 10,540,846 B2 | 1/2020 | Shigeta |
| 10,580,254 B2 | 3/2020 | Shigeta |
| 10,593,154 B2 | 3/2020 | Shigeta |
| 10,600,279 B2 | 3/2020 | Shigeta |
| 10,600,282 B2 | 3/2020 | Shigeta |
| 10,665,054 B2 | 5/2020 | Shigeta |
| 10,706,675 B2 | 7/2020 | Shigeta |
| 10,720,013 B2 | 7/2020 | Main, Jr. |
| 10,741,019 B2 | 8/2020 | Shigeta |
| 10,748,378 B2 | 8/2020 | Shigeta |
| 10,755,524 B2 | 8/2020 | Shigeta |
| 10,755,525 B2 | 8/2020 | Shigeta |
| 10,762,745 B2 | 9/2020 | Shigeta |
| 10,825,288 B1 | 11/2020 | Knust et al. |
| 10,832,517 B2 | 11/2020 | Bulzacki et al. |
| 10,846,980 B2 | 11/2020 | French et al. |
| 10,846,985 B2 | 11/2020 | Shigeta |
| 10,846,986 B2 | 11/2020 | Shigeta |
| 10,846,987 B2 | 11/2020 | Shigeta |
| 11,244,191 B2 * | 2/2022 | Yao .................. G06N 3/045 |
| 11,284,041 B1 * | 3/2022 | Bergamo ................ G06T 7/251 |
| 11,386,306 B1 * | 7/2022 | Siddiquie ............. G06V 10/774 |
| 2005/0059479 A1 | 3/2005 | Soltys et al. |
| 2006/0019739 A1 | 1/2006 | Soltys et al. |
| 2011/0115158 A1 | 5/2011 | Gagner et al. |
| 2011/0230248 A1 | 9/2011 | Baerlocher et al. |
| 2016/0089594 A1 | 3/2016 | Yee |
| 2018/0040190 A1 | 2/2018 | Keilwert et al. |
| 2018/0053377 A1 | 2/2018 | Shigeta |
| 2018/0060730 A1 * | 3/2018 | Kurata .................. G06F 40/289 |
| 2018/0061178 A1 | 3/2018 | Shigeta |
| 2018/0068525 A1 | 3/2018 | Shigeta |
| 2018/0075698 A1 | 3/2018 | Shigeta |
| 2018/0114406 A1 | 4/2018 | Shigeta |
| 2018/0211110 A1 | 7/2018 | Shigeta |
| 2018/0211472 A1 | 7/2018 | Shigeta |
| 2018/0232987 A1 | 8/2018 | Shigeta |
| 2018/0239984 A1 | 8/2018 | Shigeta |
| 2018/0336757 A1 | 11/2018 | Shigeta |
| 2019/0043309 A1 | 2/2019 | Shigeta |
| 2019/0088082 A1 | 3/2019 | Shigeta |
| 2019/0102987 A1 | 4/2019 | Shigeta |
| 2019/0147689 A1 | 5/2019 | Shigeta |
| 2019/0172312 A1 | 6/2019 | Shigeta |
| 2019/0188957 A1 | 6/2019 | Bulzacki et al. |
| 2019/0188958 A1 | 6/2019 | Shigeta |
| 2019/0236891 A1 | 8/2019 | Shigeta |
| 2019/0259238 A1 | 8/2019 | Shigeta |
| 2019/0266832 A1 | 8/2019 | Shigeta |
| 2019/0318576 A1 | 10/2019 | Shigeta |
| 2019/0320768 A1 | 10/2019 | Shigeta |
| 2019/0333322 A1 | 10/2019 | Shigeta |
| 2019/0333323 A1 | 10/2019 | Shigeta |
| 2019/0333326 A1 | 10/2019 | Shigeta |
| 2019/0340873 A1 | 11/2019 | Shigeta |
| 2019/0344157 A1 | 11/2019 | Shigeta |
| 2019/0347893 A1 | 11/2019 | Shigeta |
| 2019/0347894 A1 | 11/2019 | Shigeta |
| 2019/0362594 A1 | 11/2019 | Shigeta |
| 2019/0371112 A1 | 12/2019 | Shigeta |
| 2019/0392680 A1 | 12/2019 | Shigeta |
| 2020/0034629 A1 | 1/2020 | Vo et al. |
| 2020/0035060 A1 | 1/2020 | Shigeta |
| 2020/0065618 A1 * | 2/2020 | Zhang .................... G06V 10/82 |
| 2020/0118390 A1 | 4/2020 | Shigeta |
| 2020/0122018 A1 | 4/2020 | Shigeta |
| 2020/0175806 A1 | 6/2020 | Shigeta |
| 2020/0202134 A1 | 6/2020 | Bulzacki et al. |
| 2020/0226878 A1 | 7/2020 | Shigeta |
| 2020/0234464 A1 | 7/2020 | Shigeta |
| 2020/0242888 A1 | 7/2020 | Shigeta |
| 2020/0258351 A1 | 8/2020 | Shigeta |
| 2020/0265672 A1 | 8/2020 | Shigeta |
| 2020/0273289 A1 | 8/2020 | Shigeta |
| 2020/0294346 A1 | 9/2020 | Shigeta |
| 2020/0302168 A1 * | 9/2020 | Vo ....................... G07F 17/3206 |
| 2020/0342281 A1 | 10/2020 | Shigeta |
| 2020/0349806 A1 | 11/2020 | Shigeta |
| 2020/0349807 A1 | 11/2020 | Shigeta |
| 2020/0349808 A1 | 11/2020 | Shigeta |
| 2020/0349809 A1 | 11/2020 | Shigeta |
| 2020/0349810 A1 | 11/2020 | Shigeta |
| 2020/0349811 A1 | 11/2020 | Shigeta |
| 2020/0364979 A1 | 11/2020 | Shigeta |
| 2020/0372746 A1 | 11/2020 | Shigeta |
| 2020/0372752 A1 | 11/2020 | Shigeta |
| 2021/0190937 A1 * | 6/2021 | Niu ........................ G06V 20/00 |
| 2021/0312187 A1 * | 10/2021 | Que ........................ G06T 7/292 |
| 2022/0101688 A1 * | 3/2022 | Shigeta ............... G07F 17/3241 |
| 2022/0139148 A1 * | 5/2022 | Shigeta ............... G07F 17/3237 |
| | | 235/451 |

OTHER PUBLICATIONS

Sabottke et al. "The Effect of Image Resolution on Deep Learning in Radiography", Radiology: Artificial Intelligence 2020 (Year: 2020).*

Hashemi "Enlarging smaller images before inputting into convolutional neural network: zero-padding vs. interpolation", Journal of Big Data, (2019) 6:98 (Year: 2019).*

Ville Koskela, "Rectangle Packer Demo," Web page <https://github.com/villekoskelaorg/RectanglePacking/blob/master/src/org/villekoskela/

(56) References Cited

OTHER PUBLICATIONS

RectanglePackerDemo.as>, 3 pages, printed from the Internet on Aug. 11, 2021.

* cited by examiner

| GAME STATE | IMAGE CAPTURE SETTINGS | | |
|---|---|---|---|
| | OVERLAY TEMPLATE | RESOLUTION | EXPOSURE |
| BETTING MODE | (505) | MAXIMUM | LONG |
| MAIN PLAY MODE | (512) | MEDIUM | SHORT |
| BONUS PLAY/ GESTURING MODE | (522) | LOW | SHORT |
| SERVICES MODE | (533) | HIGH | MEDIUM |

FIG. 5

GAMING ENVIRONMENT TRACKING OPTIMIZATION

CROSS-REFERENCE TO RELATED APPLICATION

This application claims the priority benefit of U.S. Provisional Patent Application No. 63/001,941 filed Mar. 30, 2020, which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, apparatus, and methods and, more particularly, to image optimization and tracking of a gaming environment.

BACKGROUND

Casino gaming environments are dynamic environments in which people, such as players, casino patrons, casino staff, etc., take actions that affect the state of the gaming environment, the state of players, etc. For example, a player may use one or more physical tokens to place wagers on the wagering game. In another example, a player may perform hand gestures to perform gaming actions and/or to communicate instructions during a game, such as making gestures to hit, stand, fold, etc. In yet another example, a player may move physical cards, dice, gaming props, etc. A multitude of other changes may occur at any given time. To effectively manage such a dynamic environment, the casino operators may employ one or more tracking systems or techniques to monitor aspects of the casino gaming environment, such as credit balance, player account information, player movements, game play events, and the like. The tracking systems may generate a historical record of these monitored aspects to enable the casino operators to facilitate, for example, a secure gaming environment, enhanced game features, and/or enhanced player features (e.g., rewards and benefits to known players with a player account).

However, some tracking systems experience challenges. For instance, automated tracking systems need to be able to track a variety of objects in a gaming environment within an acceptable amount of time to perform certain game-related operations. For instance, a gaming system may be configured to identify gaming tokens used during betting periods, to identify game-play elements (e.g., cards or dice) used during game play, to identify interactive player gestures, etc. To analyze the images, the gaming system may utilize one or more neural network models. A neural network model needs a sufficient level of quality in an image to be able to identify or classify objects depicted in the images with a certain level of confidence. However, although the image needs to have a certain level of quality, it cannot be too high of image quality. For instance, in order to perform image identification quickly, a neural network model may need to have a maximum resolution limit for any image it accepts for analysis (e.g. the image has to have a certain level of resolution, but not too high a resolution or else the neural network model will not accept the image for analysis). However, that maximum resolution limit is small (e.g., 512×512) compared to the large resolution at which a modern camera takes pictures (e.g. 3840×2160). Thus, a neural network model with such a small input limit would not be able to accept a large image file taken from a modern camera. However, merely shrinking an entire 3840×2160 image down to a 512×512 image would cause the pixel size for the objects depicted within the shrunken image to be too small to be recognizable by the neural network model.

To add to the challenges, some neural networks models may need differing levels of image quality in order to attain sufficient confidence levels for different gaming operations. However, a camera, in the gaming environment, which captures the images, can only take a picture at one level of image quality at a time. Thus, the neural network model's input requirement is mismatched to the camera's native image quality settings.

To further add to the challenges, some gaming systems need to access neural network models at locations that are remote or distant, such as a neural network model stored and/or executed by a processor that is only accessible via a communications network. However, the transfer of many images across a communications network takes a large amount of time.

These, and other challenges, slow down game play at a casino, leading to less gambling in any given period, which results in lower revenue for a casino. Furthermore, slow game play can distract from the fun of game play for game participants.

Accordingly, a new gaming system is desired that overcomes these, and other, challenges.

SUMMARY

According to one aspect of the present disclosure, a gaming system is provided that receives a frame of image data captured by a camera at a gaming table, generates a set of images from portions of the frame of image data, and determines whether the set of images meets an input requirement of a neural network model. If the set of images does not meet the input requirement, the gaming system modifies, by an incremental amount, an image property of a subset from the set of images until the set of images meets the input requirement. When the set of images meets the input requirement, the gaming system provides the set of images as a unit (e.g., as a composite of the set of images) to the neural network model for concurrent analysis.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4 and FIG. 5 are diagrams associated with the data flow shown in FIG. 3 according to one or more embodiments of the present disclosure.

Figure 1:
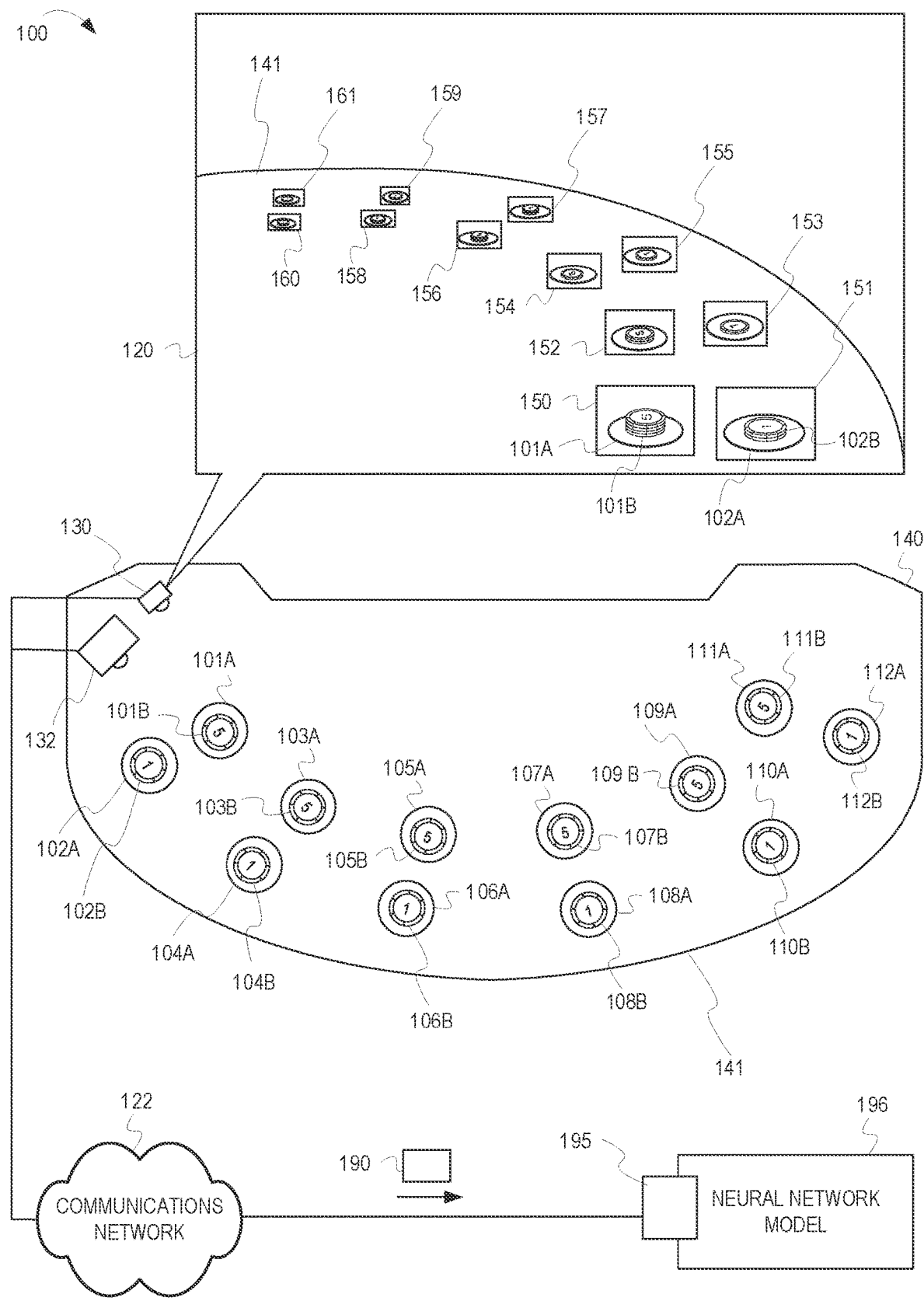
FIG. 1 illustrates an example gaming system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Systems and methods described herein optimize images, image capturing, image processing, image transfer, etc., to facilitate improved analysis by a neural network model. For instance, some embodiments determine whether a set of images meets an input requirement of a neural network model. If the set of images does not meet the input requirement, the gaming system modifies, by an incremental amount, an image property of a subset from the set of images until the set of images meets the input requirement. When the set of images meets the input requirement, the gaming system transmits the set of images as a unit (e.g., as a composite of the set of images) to the neural network model for analysis. The optimizing, for example, increases a speed at which a neural network model receives and/or analyzes the captured images of a gaming area. Increasing the speed permits for fast, and accurate, object identification and/or classification, thus permitting automation of a wide variety of gaming operations related to various events, game states, etc. Increasing the speed and accuracy of a gaming tracking system permits for more gambling (by casino patrons) in any given period, which results in higher revenue for a casino as well as improving the game-play experience of game participants.

FIG. 1 illustrates an example gaming system according to one or more embodiments of the present disclosure. The gaming system 100 includes a gaming table 140, a camera 130 and a projector 132. The camera 130 captures one or more images of a gaming area the camera 130 is a webcam that generates a video feed of captured images of the gaming area). The gaming area encompasses the gaming table 140 and the environment around the gaming table 140. The projector 132 is configured to project images of gaming content. The projector 132 projects the images of the gaming content toward the surface of the gaming table 140 relative to objects (in the gaming area) depicted within the one or more images. Some examples of objects include printed betting circles (e.g., main betting circle 101A and secondary betting circle 102A), gaming tokens (e.g., chip stack 101B and chip stack 102B), game participants (not shown), etc. The camera 130 is positioned above the surface of the gaming table 140. The camera 130 has a first perspective (e.g., field of view or angle of view) of the gaming area. The first perspective may be referred to in this disclosure more succinctly as a camera perspective or viewing perspective. For example, the camera 130 has a lens that is pointed at the gaming table 140 in a way that views portions of a surface of the gaming table 140 relevant to game play. The lens also views objects in the gaming area, such as game participants (e.g., players, dealer, back-betting patrons, etc.) positioned around the gaming table 140. The projector 132 is also positioned above the gaming table 140 near the camera 130. The projector has a second perspective (e.g., projection direction, projection angle, projection view, or projection cone) of the gaming area. The second perspective may be referred to in this disclosure more succinctly as a projection perspective. For example, the projector has a lens that is pointed at the gaming table 140 in a way that projects (or throws) images of gaming content onto substantially similar portions of the gaming area that the camera 130 views. Because the lenses of the camera 130 and the projector 132 are not in the same location, the camera perspective is different from the projection perspective. However, the gaming system 100 can translate or map between the camera perspective and the projection perspective such that they substantially, and accurately, overlay each other.

As mentioned, some examples of objects in the gaming area include printed betting circles (such as main betting circle 101A and secondary betting circle 102A) and gaming tokens (such as chip stack 101B and chip stack 102B). The main betting circle 101A and secondary betting circle 102A are associated with a first of six different player stations at the gaming table 140. In other words, a first player (not shown) may be situated (near an outer edge 141 of the gaming table) at the first player station and can use the main betting circle 101A to place at wager on a main wagering game (e.g., Blackjack) presented at the gaming table 140. The first player can use the secondary betting circle 102A to place a wager on a secondary wagering game feature (e.g., a bonus game or round) offered at the gaming table 140. For example, during a betting round for the main wagering game, the first player places the chip stack 101B into the main betting circle 101A as a wager on the main wagering game. Further, the first player places the chip stack 102B within the secondary betting circle 102A as a wager on the secondary wagering game feature. In some instances, the secondary betting feature is optional. As used herein, the term "stack" refers to one or more gaming tokens physically grouped together.

Likewise, additional players at additional player stations can place their wagers in respective main betting circles and secondary betting circles. For instance, a second player (not shown) is situated at the second player station of the gaming table 140, to which main betting circle 103A and secondary betting circle 104A are associated. In the betting round for the main wagering game, the second player places, as a main wager, chip stack 103B in main betting circle 103A. Further, the second player places, as a secondary wager, chip stack 104B into secondary betting circle 104A. Similarly a third, fourth, fifth and six player are situated at the gaming table 140 in respective third, fourth, fifth and sixth player stations. They respectively place their main and secondary wagers at the gaming table 140 (e.g., the third player places chip stack 105B in main betting circle 105A and chip stack 106B in secondary betting circle 106A, the fourth player places chip stack 107B in main betting circle 107A and chip stack 108B in secondary betting circle 108A, the fifth player places chip stack 109B in main betting circle 109A and chip stack 110B in secondary betting circle 110A, and the sixth player places chip stack 111E in main betting circle 111A and chip stack 112B in secondary betting circle 112A). The wagers are placed during a specific game state (e.g., while the wagering game is in a "betting mode").

During the betting mode (after the wagers are all physically placed at the gaming table 140), the camera 130 captures a frame of image data 120 of the gaming area using image capture settings associated with the camera 130. In some embodiments, the gaming system 100 can dynamically select and/or change image capture settings for the camera 130 based on the game state (e.g., see FIG. 5 for more detail).

In the example shown in FIG. 1, the gaming system 100 selects portions of the frame of image data 120, such as by selecting graphical rectangles 150-161 (i.e., rectangle 150, rectangle 151, rectangle 152, rectangle 153, rectangle 154, rectangle 155, rectangle 156, rectangle 157, rectangle 158, rectangle 159, rectangle 160 and rectangle 161). The gaming system 100 selects (e.g., using a click-and-drag operation to create) the rectangles 150-161 at specific locations within the frame of image data 120, which locations correspond to the printed betting circles. The locations for the rectangles 150-161 may be determined prior to beginning game play (such as during a configuration process of the gaming table 140). The locations may be determined manually or automatically. Furthermore, the rectangles 150-161 can be created (e.g. selected) on a transparent graphical layer using a graphical image annotation tool. In one example, the transparent graphical layer can be positioned over a video feed of the camera 130 and sized to the boundaries of the frame of image data 120.

As an example, rectangle 150 overlays main betting circle 101A as well as the area slightly above the main betting circle 101A so as to include portions of the frame of image data 120 that encompass both the main betting circle 101A and a chip stack that may be in main betting circle 101A (e.g., chip stack 101B). In a similar way, rectangle 151 overlays secondary betting circle 102A as well as an area slightly above secondary betting circle 102A so as to include portions of the frame of image data 120 that encompass both the secondary betting circle 102A and a chip stack that may be in the secondary betting circle 102A (e.g., chip stack 102B), Similarly, rectangle 152 overlays main betting circle 103A and chip stack 103B; rectangle 153 overlays secondary betting circle 104A and chip stack 104B; rectangle 154 overlays main betting circle 105A and chip stack 105B; rectangle 155 overlays secondary betting circle 106A and chip stack 106B; rectangle 156 overlays main betting circle 107A and chip stack 107B; rectangle 157 overlays secondary betting circle 108A and chip stack 108B; rectangle 158 overlays main betting circle 109A and chip stack 109B; rectangle 159 overlays secondary betting circle 110A and chip stack 110B; rectangle 160 overlays main betting circle 111A and chip stack 111B; and rectangle 161 overlays secondary betting circle 112A and chip stack 112B.

After the gaming system 100 selects the portions of the frame of image data 120 (e.g., by overlaying the rectangles 150-161), the gaming system 100 copies the portions from the frame of image data 120 to generate a set of images, each of which has some common image characteristics based on the image capture settings of the camera 130. For instance, although each of the images is clearly less than the entire size of the frame of image data 120, the frame of image data 120 was captured at the same image resolution, at the same aspect ratio, using the same exposure and light settings (e.g., the same aperture setting, the same shutter speed setting, the same ISO setting), etc. Thus each of the copied portions possess some common image characteristics (e.g., the same image resolution).

The gaming system 100 then processes the set of images for optimal transmission and analysis by a neural network model 196. For example, before attempting to transmit the set of images, the gaming system 100 determines an input requirement 195 for the neural network model 196 and determines, based on the input requirement 195, whether to modify one or more of the set of images to meet the input requirement 195. For instance, the gaming system 100 determines whether to make some images sharper, whether to change a color balance of some images, whether to change a contrast of some images, whether to change a resolution of some images, etc. These changes optimize the image(s) for the neural network model analysis.

In one example, the gaming system 100 may iteratively (e.g., in a looping manner), scale a subset of only the largest image(s), from the set of images, and check, before running a subsequent iteration, (e.g., after each iterative scaling of the subset) whether the set of images, as a whole, fit into a target rectangle (e.g., rectangle 495 shown in FIG. 4), which target rectangle represents a maximum resolution limit for any given image that a neural network model (e.g., neural network model 196) needs to analyze. The maximum resolution limit ensures that the neural network model 196 can perform analysis of the input image within a specific amount of time. However, the maximum resolution limit also limits the size of the image(s) it will receive. Thus, any processing that can be done to any of the set of images, before sending the set of images to the neural network model, is preferred.

In one embodiment, the gaming system 100 intelligently processes the set of images by determining which one(s) of the set of images has a highest image quality value amongst the set (e.g. determines which one(s) of the set of images are largest during each iteration), then scales those one(s) by an incremental amount (e.g., scaling a width of the largest of images by 1 pixel and scaling a height proportionately based on an aspect ratio for the camera). The smallest of the set of images are not scaled. As soon as the subset is sufficiently scaled so that all of the set of images fit into the rectangle without overlapping each other, then the entire set of images is packed into a unit (e.g., a sprite sheet 190) and transmitted to the neural network model 196 for concurrent evaluation as a unit (e.g., as a single image file). This ensures that the smaller images, from the set of images, retain their original quality as captured from the frame of image data 120. Thus, the gaming system can provide the neural network model with a single image that meets its input requirement, and every one of the set of images (from the modified/scaled larger ones to the unscaled smaller ones) possesses a sufficient image quality for analysis and confident identification and classification by the neural network model. Further, because only one image file (e.g., the sprite sheet 190) is transmitted (e.g., via a communications network 122), as opposed to transmitting each of the set of images separately, then the overall amount of data that needs to be transferred is reduced (by the scaling), thus network transmission time is reduced, and consequently the gaming system can quickly and accurately obtain analysis data back from the neural network model.

Figure 2:
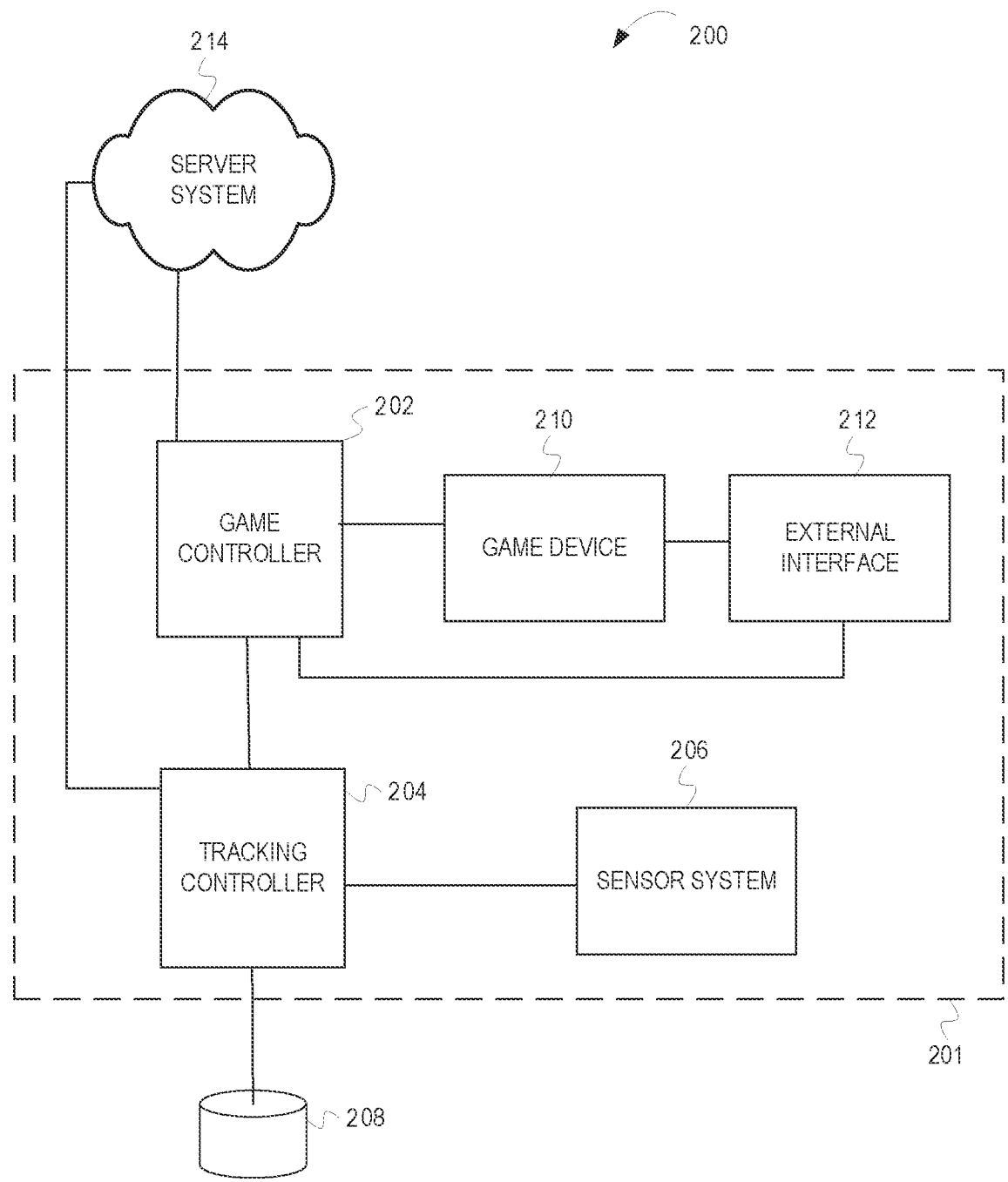
FIG. 2 is a diagram of an exemplary gaming system according to one or more embodiments of the present disclosure.

FIG. 2 is a block diagram of an example gaming system 200 for tracking aspects of a wagering game in a gaming area 201. In the example embodiment, the gaming system 200 includes a game controller 202, a tracking controller 204, a sensor system 206, and a tracking database system 208. In other embodiments, the gaming system 200 may include additional, fewer, or alternative components, including those described elsewhere herein.

The gaming area 201 is an environment in which one or more casino wagering games are provided. In the example embodiment, the gaming area 201 is a casino gaming table and the area surrounding the table (e.g., as in FIG. 1). In other embodiments, other suitable gaming areas 201 may be monitored by the gaining gaming system 200. For example, the gaming area 201 may include one or more floor-standing electronic gaming machines. In another example, multiple gaming tables may be monitored by the gaming system 200. Although the description herein may reference a gaming area (such as gaming area 201) to be a single gaming table and the area surrounding the gaming table, it is to be understood that other gaming areas 201 may be used with the gaming system 200 by employing the same, similar, and/or adapted details as described herein.

The game controller 202 is configured to facilitate, monitor, manage, and/or control gameplay of the one or more games at the gaming area 201, More specifically, the game controller 202 is communicatively coupled to at least one or more of the tracking controller 204, the sensor system 206, the tracking database system 208, a gaming device 210, an external interface 212, and/or a server system 214 to receive, generate, and transmit data relating to the games, the players, and/or the gaming area 201. The game controller 202 may include one or more processors, memory devices, and communication devices to perform the functionality described herein. More specifically, the memory devices store computer-readable instructions that, when executed by the processors, cause the game controller 202 to function as described herein, including communicating with the devices of the gaming system 200 via the communication device(s).

The game controller 202 may be physically located at the gaming area 201 as shown in FIG. 2 or remotely located from the gaming area 201. In certain embodiments, the game controller 202 may be a distributed computing system. That is, several devices may operate together to provide the functionality of the game controller 202. In such embodiments, at least some of the devices (or their functionality) described in FIG. 2 may be incorporated within the distributed game controller 202.

The gaming device 210 is configured to facilitate one or more aspects of a game. For example, for card-based games, the gaming device 210 may be a card shuffler, shoe, or other card-handling device. The external interface 212 is a device that presents information to a player, dealer, or other user and may accept user input to be provided to the game controller 202. In some embodiments, the external interface 212 may be a remote computing device in communication with the game controller 202, such as a player's mobile device. In other examples, the gaming device 210 and/or external interface 212 includes one or more projectors. The server system 214 is configured to provide one or more backend services and/or gameplay services to the game controller 202. For example, the server system 214 may include accounting services to monitor wagers, payouts, and jackpots for the gaming area 201. In another example, the server system 214 is configured to control gameplay by sending gameplay instructions or outcomes to the game controller 202. It is to be understood that the devices described above in communication with the game controller 202 are for exemplary purposes only, and that additional, fewer, or alternative devices may communicate with the game controller 202, including those described elsewhere herein.

In the example embodiment, the tracking controller 204 is in communication with the game controller 202. In other embodiments, the tracking controller 204 is integrated with the game controller 202 such that the game controller 202 provides the functionality of the tracking controller 204 as described herein. Like the game controller 202, the tracking controller 204 may be a single device or a distributed computing system. In one example, the tracking controller 204 may be at least partially located remotely from the gaming area 201. That is, the tracking controller 204 may receive data from one or more devices located at the gaming area 201 (e.g., the game controller 202 and/or the sensor system 206), analyze the received data, and/or transmit data back based on the analysis.

In the example embodiment, the tracking controller 204, similar to the example game controller 202, includes one or more processors, a memory device, and at least one communication device. The memory device is configured to store computer-executable instructions that, when executed by the processor(s), cause the tracking controller 204 to perform the functionality of the tracking controller 204 described herein. The communication device is configured to communicate with external devices and systems using any suitable communication protocols to enable the tracking controller 204 to interact with the external devices and integrates the functionality of the tracking controller 204 with the functionality of the external devices. The tracking controller 204 may include several communication devices to facilitate communication with a variety of external devices using different communication protocols.

The tracking controller 204 is configured to monitor at least one or more aspects of the gaming area 201. In the example embodiment, the tracking controller 204 is configured to monitor physical objects within the area 201, and determine a relationship between one or more of the objects. Some objects may include gaming tokens. The tokens may be any physical object (or set of physical objects) used to place wagers. As used herein, the term "stack" refers to one or more gaming tokens physically grouped together. For circular tokens typically found in casino gaming environments (e.g., gaming chips), these may be grouped together into a vertical stack. In another example in which the tokens are monetary bills and coins, a group of bills and coins may be considered a "stack" based on the physical contact of the group with each other and other factors as described herein.

In the example embodiment, the tracking controller 204 is communicatively coupled to the sensor system 206 to monitor the gaming area 201. More specifically, the sensor system 206 includes one or more sensors configured to collect sensor data associated with the gaming area 201, and the tracking system 204 receives and analyzes the collected sensor data to detect and monitor physical objects. The sensor system 206 may include any suitable number, type, and/or configuration of sensors to provide sensor data to the game controller 202, the tracking controller 204, and/or another device that may benefit from the sensor data.

In the example embodiment, the sensor system 206 includes at least one image sensor that is oriented to capture image data of physical objects in the gaming area 201. In one example, the sensor system 206 may include a single image sensor that monitors the gaming area 201. In another example, the sensor system 206 includes a plurality of image sensors that monitor subdivisions of the gaming area 201. The image sensor may be part of a camera unit of the sensor system 206 or a three-dimensional (3D) camera unit in which the image sensor, in combination with other image sensors and/or other types of sensors, may collect depth data related to the image data, which may be used to distinguish between objects within the image data. The image data is transmitted to the tracking controller 204 for analysis as described herein. In some embodiments, the image sensor is configured to transmit the image data with limited image processing or analysis such that the tracking controller 204 and/or another device receiving the image data performs the image processing and analysis. In other embodiments, the image sensor may perform at least some preliminary image processing and/or analysis prior to transmitting the image data. In such embodiments, the image sensor may be considered an extension of the tracking controller 204, and as such, functionality described herein related to image processing and analysis that is performed by the tracking controller 204 may be performed by the image sensor (or a dedicated computing device of the image sensor). In certain embodiments, the sensor system 206 may include, in addition to or instead of the image sensor, one or more sensors configured to detect objects, such as time-of-flight sensors, radar sensors (e.g., LIDAR), thermographic sensors, and the like.

The tracking controller 204 is configured to establish data structures relating to various physical objects detected in the image data from the image sensor. For example, the tracking controller 204 applies one or more image neural network models during image analysis that are trained to detect aspects of physical objects. Neural network models are analysis tools that classify unclassified input data without requiring user input. The unclassified input data may be "raw" data captured by the image sensor, modified data, or any combination thereof. The neural network models may be used to translate patterns within the image data to data object representations of, for example, tokens, faces, hands, etc., thereby facilitating data storage and analysis of objects detected in the image data as described herein.

At a simplified level, neural network models are a set of node functions that have a respective weight applied to each function. The node functions and the respective weights are configured to receive some form of input data (e.g., image data), establish patterns within the input data, and generate outputs based on the established patterns. The weights are applied to the node functions to facilitate refinement of the model to recognize certain patterns (i.e., increased weight is given to node functions resulting in correct outputs), and/or to adapt to new patterns. For example, a neural network model may be configured to receive input data, detect patterns in the image data representing human body parts, perform image segmentation, and generate an output that classifies one or more portions of the image data as representative of segments of a player's body parts (e.g., a box having coordinates relative to the image data that encapsulates a face, an arm, a hand, etc. and classifies the encapsulated area as a "human," "face," "arm," "hand," etc.).

For instance, to train a neural network to identify the most relevant guesses for identifying a human body part, for example, a predetermined dataset of raw image data including image data of human body parts, and with known outputs, is provided to the neural network. As each node function is applied to the raw input of a known output, an error correction analysis is performed such that node functions that result in outputs near or matching the known output may be given an increased weight while node functions having a significant error may be given a decreased weight. In the example of identifying a human face, node functions that consistently recognize image patterns of facial features (e.g., nose, eyes, mouth, etc.) may be given additional weight. Similarly, in the example of identifying a human hand, node functions that consistently recognize image patterns of hand features (e.g., wrist, fingers, palm, etc.) may be given additional weight. The outputs of the node functions (including the respective weights) are then evaluated in combination to provide an output such as a data structure representing a human face. Training may be repeated to further refine the pattern-recognition of the model, and the model may still be refined during deployment (i.e., raw input without a known data output).

At least some of the neural network models applied by the tracking controller 204 may be deep neural network (DNN) models. DNN models include at least three layers of node functions linked together to break the complexity of image analysis into a series of steps of increasing abstraction from the original image data. For example, for a DNN model trained to detect human faces from an image, a first layer may be trained to identify groups of pixels that represent the boundary of facial features, a second layer may be trained to identify the facial features as a whole based on the identified boundaries, and a third layer may be trained to determine whether or not the identified facial features form a face and distinguish the face from other faces. The multi-layered nature of the DNN models may facilitate more targeted weights, a reduced number of node functions, and/or pipeline processing of the image data (e.g., for a three-layered DNN model, each stage of the model may process three frames of image data in parallel).

In at least some embodiments, each model applied by the tracking controller 204 may be configured to identify a particular aspect of the image data and provide different outputs such that the tracking controller 204 may aggregate the outputs of the neural network models together to identify physical objects as described herein. For example, one model may be trained to identify human faces, while another model may be trained to identify the bodies of players. In such an example, the tracking controller 204 may link together a face of a player to a body of the player by analyzing the outputs of the two models. In other embodiments, a single DNN model may be applied to perform the functionality of several models.

The tracking controller 204 may generate data objects for each physical object identified within the captured image data by DNN models. The data objects are data structures that are generated to link together data associated with corresponding physical objects. For example, the outputs of several DNN models associated with a player may be linked together as part of a player data object.

It is to be understood that the underlying data storage of the data objects may vary in accordance with the computing environment of the memory device or devices that store the data object. That is, factors such as programming language and file system may vary the where and/or how the data object is stored (e.g., via a single block allocation of data storage, via distributed storage with pointers linking the data together, etc.). In addition, some data objects may be stored across several different memory devices or databases.

In some embodiments, the player data objects include a player identifier, and data objects of other physical objects include other identifiers. The identifiers uniquely identify the physical objects such that the data stored within the data objects is tied to the physical objects. In some embodiments, the identifiers may be incorporated into other systems or subsystems. For example, a player account system may store player identifiers as part of player accounts, which may be used to provide benefits, rewards, and the like to players. In certain embodiments, the identifiers may be provided to the tracking controller 204 by other systems that may have already generated the identifiers.

In at least some embodiments, the data objects and identifiers may be stored by the tracking database system 208. The tracking database system 208 includes one or more data storage devices (e.g., one or more databases) that store data from at least the tracking controller 204 in a structured, addressable manner. That is, the tracking database system 208 stores data according to one or more linked metadata fields that identify the type of data stored and can be used to group stored data together across several metadata fields. The stored data is addressable such that stored data within the tracking database system 208 may be tracked after initial storage for retrieval, deletion, and/or subsequent data manipulation (e.g., editing or moving the data). The tracking database system 208 may be formatted according to one or more suitable file system structures (e.g., FAT, exFAT, ext4, NTFS, etc.).

The tracking database system 208 may be a distributed system (i.e., the data storage devices are distributed to a plurality of computing devices) or a single device system. In certain embodiments, the tracking database system 208 may be integrated with one or more computing devices configured to provide other functionality to the gaming system 200 and/or other gaming systems. For example, the tracking database system 208 may be integrated with the tracking controller 204 or the server system 214.

In the example embodiment, the tracking database system 208 is configured to facilitate a lookup function on the stored data for the tracking controller. The lookup function compares input data provided by the tracking controller 204 to the data stored within the tracking database system 208 to identify any "matching" data. It is to be understood that "matching" within the context of the lookup function may refer to the input data being the same, substantially similar, or linked to stored data in the tracking database system 208. For example, if the input data is an image of a player's face, the lookup function may be performed to compare the input data to a set of stored images of historical players to determine whether or not the player captured in the input data is a returning player. In this example, one or more image comparison techniques may be used to identify any "matching" image stored by the tracking database system 208. For example, key, visual markers for distinguishing the player may be extracted from the input data and compared to similar key visual markers of the stored data. If the same or substantially similar visual markers are found within the tracking database system 208, the matching stored image may be retrieved. In addition to or instead of the matching image, other data linked to the matching stored image may be retrieved during the lookup function, such as a player account number, the player's name, etc. In at least some embodiments, the tracking database system 208 includes at least one computing device that is configured to perform the lookup function. In other embodiments, the lookup function is performed by a device in communication with the tracking database system 208 (e.g., the tracking controller 204) or a device in which the tracking database system 208 is integrated within.

In some embodiments, one or more image neural network models are implemented to analyze captured images. In some examples, several neural network models can be implemented together by tracking controller 204 to extract different features from the image data. That is, the neural network models may be trained to identify particular characteristics of physical objects. For example, one neural network model may be trained to identify human faces, while another neural network model may be trained to identify human torsos, while yet another neural network model may be trained to identify human hands. Although the output of the image neural network models may vary depending upon the specific functionality of each model, the outputs generally include one or more data elements that represent a physical feature or characteristic of a person or object in the image data in a format that can be recognized and processed by a tracking controller and/or other computing devices. For example, one example neural network model may be used to detect the hands of players in the image data and output a map of data elements representing "key" physical features of the detected hands, such as the position of joints or knuckles in relation to each other, palm lines, sizes of fingers, etc. The map may indicate a relative position of each hand feature within the space defined by the image data (in the case of a singular, two-dimensional image, the space may be a corresponding two-dimensional plane) and cluster several hand features together to distinguish between detected hands. The output map is a data abstraction of the underlying raw image data that has a known structure and format, which may be advantageous for use in other devices and/or software modules. In the example embodiment, applying the image neural network models to the image data causes the tracking controller to generate one or more key data elements as the outputs of the image processing (including the models). The key data elements may include any suitable amount and/or type of data based at least partially on the corresponding neural network model. At least some of the key data elements include position data indicating a relative position of the represented physical characteristics within a space at least partially defined by the scope of the image data. Key data elements may include, but are not limited to, boundary boxes, key feature points, vectors, wireframes, outlines, pose models, and the like. Boundary boxes are visual boundaries that encapsulate an object in the image and classify the encapsulated object according to a plurality of predefined classes e.g., classes may include "human," "hand," "token," "token stack," etc.). A boundary box may be associated with a single class or several classes (e.g., a player may be classified as both a "human" and a "male"). The key feature points, similar to the boundary boxes, classify features of objects in the image data, but instead assign a singular position to the classified features.

In some embodiments, the tracking controller 204 is configured to organize the key data elements (after they are generated) to identify each respective physical object. That is, the tracking controller 204 may be configured to assign the outputs of the neural network models to a particular object based at least partially on a physical proximity of the physical characteristics represented by the key data elements to each other. In some embodiments, the tracking controller 204 is configured to generate a player data object associated with a player based at least partially on key player data elements. The player data object is a structured allocation of data storage (i.e., a plurality of predefined data elements and corresponding metadata) that is attributed to a single player such that the tracking controller 204 may store data associated with the player from various sources (e.g., the different neural network models) together as the player data object. In some embodiments, the key player data elements are stored within the player data object. In other embodiments, the tracking controller 204 may generate data based on the key player data elements to be stored within the player data object, such as an aggregate pose model representing a combination of the key player data elements. In some examples the player data object is linked to a player identifier uniquely associated with the player. The player identifier may be generated by the tracking controller 204 or may be retrieved from another system or device that stores player identifiers.

For example, the player identifier may be stored by a player account system as part of a player account associated with the player. In such an example, to retrieve the player identifier, the tracking controller 204 may transmit a request to the player tracking system including biometric data, such as an image of the player's face and/or key player data elements, which can be used to identify the player. The player tracking system may transmit the player identifier back to the tracking controller 204 if a match is found. If no matching player account is found, the tracking controller 204 may generate the player identifier.

In another example, historical player data objects may be stored in a database (e.g., tracking database system 208). For example, the tracking database system 208 can store historical player data that is generated and/or collected by the tracking controller 204. The historical player data may include, but is not limited to, historical key data elements, historical player data objects, and/or historical player identifiers. The tracking controller 204 may be configured to compare data from the player data object to the historical player data objects stored in the tracking database system 208 to determine whether or not the player data object (and the associated player) matches a previously generated player data object. If a match is found, the player identifier and/or other suitable historical data may be retrieved from the tracking database system 208 to be included with the player data object. If no match is found, the player identifier may be generated by the tracking controller 204 to be included with the player data object. In other embodiments, the player data object may not be generated prior to a comparison with the historical player data stored by the tracking database system 208. That is, the key player data elements may be compared to the stored player data within the tracking database system 208 to determine whether or not a player data object associated with the player has been previously generated. If a matching player data object is found, the matching player data object may be retrieved and updated with the key player data elements. If no match is found, the player data object is then generated.

In some embodiments, the gaming system 200 may facilitate anonymized player tracking through image tracking, thereby enabling players that do not wish to provide their name or other personal identifiable information to potentially gain at least some benefits of a player account while improving the management of the game environment via enhanced gameplay tracking. That is, if a player does not have a player account, the player may still be tracked using biometric data extracted from the image data and may receive benefits for tracked gameplay, such as an award for historical performance and/or participation of the player. The biometric data is data that, through one or more detected physical features of the player, distinguishes the player from others. The biometric data may include, but is not limited to, the key player data elements and/or data derived from the key player data elements.

In embodiments with anonymized player tracking, the tracking controller 204 may determine that no existing player account is associated with the player, and then generates the player identifier or retrieves the player identifier from historical player data within the tracking database system 208. The anonymized player identifier may be temporarily associated with the player until a predetermined period of time or a predetermined period of inactivity (i.e., the player is not detected or has not participated in a game over a period of time) has expired. Upon expiration, the player data object and/or the player identifier may be deleted from storage, and the player identifier is reintroduced into a pool of available player identifiers to be assigned to other players.

In some embodiment, the tracking controller 204 is configured to generate other identifiers, such as a token identifier for a token stack based on the key token data elements. Like the player identifier, the token identifier uniquely identifies the token stack. The token identifier may be used to link the token stack to a player. The tracking controller 204 may generate other data based on the key token data elements and/or other suitable data elements from external systems and/or sensor systems. The token identifier may be assigned to a token stack on a temporary basis. That is, the token stack may change over time (e.g., the addition or removal of tokens, splitting the stack into smaller sets, etc.), and as a result, the features indicated by the key token data elements to distinguish the token stack may not remain fixed. Unlike the anonymized player identifiers, which may expire after a relatively extended period of time (e.g., two weeks to a month), the token identifiers may "expire" over a relatively shorter period of time, such as a day, to ensure a pool of token identifiers are available for newly detected token stacks or sets. In certain embodiments, the token identifiers may be reset in response to a game event of the game conducted at a gaming table. For example, the conclusion of a game round and/or a payout process may cause at least one or more token identifiers to be reset. In some embodiments, the tracking controller 204 is configured to link the token set and player together in response to determining the player is the owner or originator of the token set. More specifically, the tracking controller 204 detects a physical proximity between physical characteristics represented by the key player data elements and the key token data elements, and then links the token identifier to the player data object. The physical proximity may indicate, for example, that the player is holding the token set within his or her hand. In one example, the physical proximity is determined by comparing positional data of the key token data elements to positional data of one or more player data objects associated with players present in the image data. For instance, the linking is performed by storing the token identifier with or within a player data object. The player data object may be configured to store one or more token identifiers at a given time to enable multiple token sets to be associated with the player. However, in some embodiments, each token identifier may be linked to a single player data object at a given time to prevent the token set from being erroneously attributed to an intermediate player. As used herein, an "intermediate player" is a player that may handle or possess the token set between the player and a bet area. For example, a back player may pass his or her tokens to an active player to reach a bet area on a gaming table. In this example, the active player has not gained possession of the tokens, but is merely acting as an intermediate to assist the back player in placing a wager. Even though the tracking controller 204 may detect a physical relationship or proximity between the token set and the intermediate player, the previous link by the original player and the token set may prevent the tracking controller 204 from attributing the token set to the intermediate player.

Linking the token set to a particular player may have several advantages. For example, a payout process may be improved by providing a dealer with improved information regarding (i) who placed which wager and (ii) at least some identifiable information for locating the winning players for the payout. For instance, the game controller 202 and/or the tracking controller 204 may monitor play of the game at the game table, determine an outcome of the game, and determine which (if any) wagers are associated with a winning outcome resulting in a payout. The tracking controller 204 may transmit a payout message to the game controller 102 and/or a dealer interface (not shown) to visually indicate to the dealer the one or more players associated with the winning outcome wagers. The payout message may include an indication of the winning players such as, but not limited to, an image of the player's face, the player's name, a nickname, and the like. In certain embodiments, the tracking controller 204 may include a display, a speaker, and/or other audiovisual devices to present the information from the payout message.

In at least some embodiments, the tracking controller 204 is configured to generate one or more tracking messages to be transmitted to one or more external devices or systems. More specifically, the functionality of other systems in communication with the tracking controller 204 may be enhanced and/or dependent upon data from the tracking controller 204. In some embodiments, the tracking message is transmitted to a server system 214. The tracking messages are data structures having a predetermined format such that the tracking controller 204 and a recipient of the tracking message can distinguish between data elements of the tracking message. The contents of the tracking messages may be tailored to the intended recipient of the tracking message, and tracking messages transmitted to different recipients may differ in the structure and/or content of the tracking messages.

In one example, a player account system in communication with the tracking controller 204 may receive the tracking message to identify any players with player accounts present within the gaming environment monitored by the tracking controller 204. In such an example, the tracking message may include location data indicating a location of the player. The location data may indicate the area monitored by the tracking controller 204, or the location data may include further details of the player's location, such as an approximate location of the player within the area monitored by the tracking controller 204 based at least partially on the positions of key player data elements of the player. In another example, the tracking message may be transmitted to the game controller and/or an accounting system for monitoring wagers, payouts, and the players associated with each wager and payout.

In some embodiments, the gaming system 200 analyzes multiple images, over time. For instance, the gaming system 200 may, for a first frame of image data (captured at a first time), generate a boundary box for a physical object, then use the boundary box for a second frame of image data (captured at a second time after the first time). The boundary box may be a visual or graphical representation of one or more underlying key token data elements. For example, and without limitation, the key token data elements may specify coordinates within the frames for each corner of the boundary box, a center coordinate of the boundary box, and/or vector coordinates of the sides of the boundary box. Other key token data elements may be associated with the boundary box that are not used to specify the coordinates of the boundary box within the frames, such as, but not limited to, classification data (i.e., classifying the object in the frames as a "token set") and/or value data (e.g., identifying a value of the token set). For instance, the position of the boundary box is updated for each frame analyzed by a tracking controller 204 such that a particular token set can be tracked over time. In at least some embodiments, the tracking controller 204 compares key token data elements generated for a particular frame to key token data elements of previously analyzed frames to determine if the token set has been previously detected. The previously analyzed frames may include the immediately preceding frames over a period of time (e.g., ten seconds, one minutes, or since the game has started) and/or particular frames extracted from a group of analyzed frames to reduce the amount of data storage and reduce the data processing required to perform the comparison of the key token data elements. For instance, a tracking controller 204 can be configured to detect three aspects of players in captured image data: (i) faces, (ii) hands, and (iii) poses. As used herein, "pose" or "pose model" may refer to physical characteristics that link together other physical characteristics of a player. For example, a pose of a player may include features from the face, torso, and/or arms of the player to link the face and hands of the player together. The tracking controller 204 can generate various boundary boxes for the identified physical characteristics, such as a left hand boundary box, a right hand boundary box, a pose model, a face or head boundary box, and facial feature points. In some embodiments, the boundary boxes are the outputs of one or more neural network models applied by the tracking controller 204. A pose model can be used to link together outputs from multiple neural network models to associate the outputs with a single player. That is, the key player data elements generated by the tracking controller 204 may not be associated with a player immediately upon generation of the key player data elements. Rather, the key player data elements are pieced or linked together to form a player data object as described herein. The key player data elements that form the pose model may be used to find the link between the different outputs associated with a particular player. In some examples, a pose model includes pose feature points and connectors. The pose feature points represent key features of the player that may be used to distinguish the player from other players and/or identify movements or actions of the player. For example, the eyes, ears, nose, mouth corners, shoulder joints, elbow joints, and wrists of the player may be represented by respective pose feature points. The pose feature points may include coordinates relative to the captured image data to facilitate positional analysis of the different feature points and/or other key player data elements. The pose feature points may also include classification data indicating which feature is represented by the respective pose feature point. The connectors visually link together the pose feature points for the player. The connectors may be extrapolated between certain pose feature points (e.g., a connector is extrapolated between pose feature points representing the wrist and the elbow joint of the player). In some embodiments, the pose feature points may be combined via the connectors and/or by linking the feature points to the same player) by one or more corresponding neural network models applied by the tracking controller 204 to captured image data. In other embodiments, the tracking controller 204 may perform one or more processes to associate the pose feature points to a particular player. For example, the tracking controller 204 may compare coordinate data of the pose feature points to identify a relationship between the represented physical characteristics (e.g., an eye is physically near a nose, and therefore the eye and nose are determined to be part of the same player).

At least some of the pose feature points may be used to link other key player data elements to the pose model (and, by extension, the player). More specifically, at least some pose feature points ay represent the same or nearby physical features or characteristics as other key player data elements, and based on a positional relationship between the pose feature point and another key player data element, a physical relationship may be identified. In one example the pose feature points include wrist feature points that represent wrists detected in captured image data by the tracking controller 204. The wrist feature points may be compared to a plurality of hand boundary boxes (or vice versa such that a hand boundary box is compared to a plurality of wrist feature points) to identify a positional relationship with one of the hand boundary boxes and therefore a physical relationship between the wrist and the hand.

In at least some embodiments, the tracking controller 204 is configured to generate annotated image data. The annotated image data may be the image data with at least the addition of graphical and/or metadata representations of the data generated by the tracking controller 204. For example, if the tracking controller 204 generates a bounding box encapsulating a hand, a graphical representation of the boundary box may be applied to the image data to represent the generated boundary box. The annotated image data may be an image filter that is selectively applied to the image data or an altogether new data file that aggregates the image data with data from the tracking controller 204. The annotated image data may be stored as individual images and/or as video files. The annotated image data may be stored in a database e.g., tracking database system 208) as part of the historical object data.

In other examples, other suitable image processing techniques and tools may be implemented by the tracking controller 204 in place of, or in combination with, the neural network models. For example, a 3D camera (e.g., of the sensor system 206) may generate a depth map that provides depth information related to the image data such that objects may be distinguished from each other and/or classified based on depth. Some key data elements may be generated from the depth map. In another example, a LIDAR sensor (e.g., of the sensor system 206) may be configured to detect objects to generate kay data elements.

Figure 3:
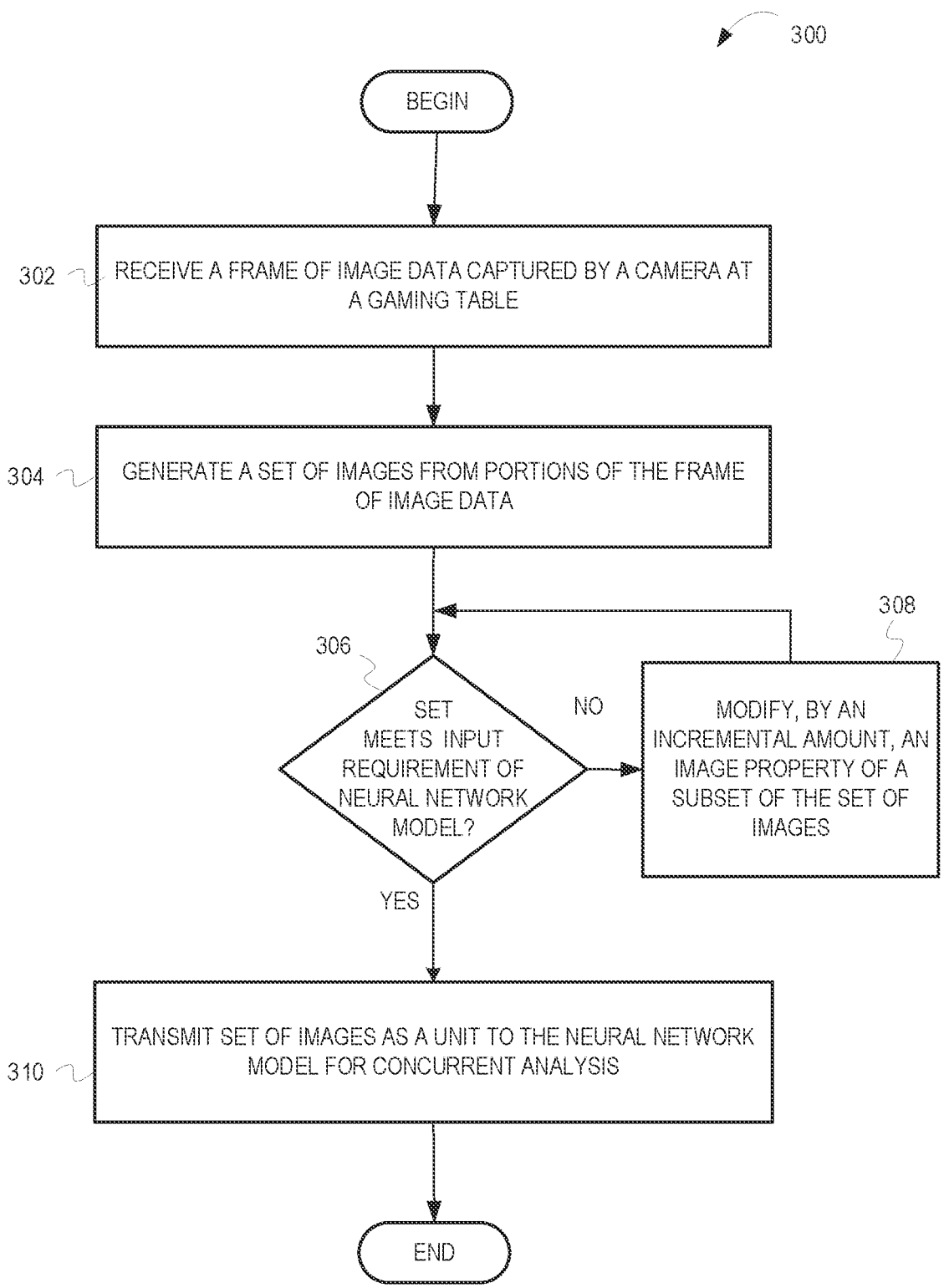
FIG. 3 is a flow diagram of an example method for gaming environment image and tracking optimization according to one or more embodiments of the present disclosure.
Figure 4:
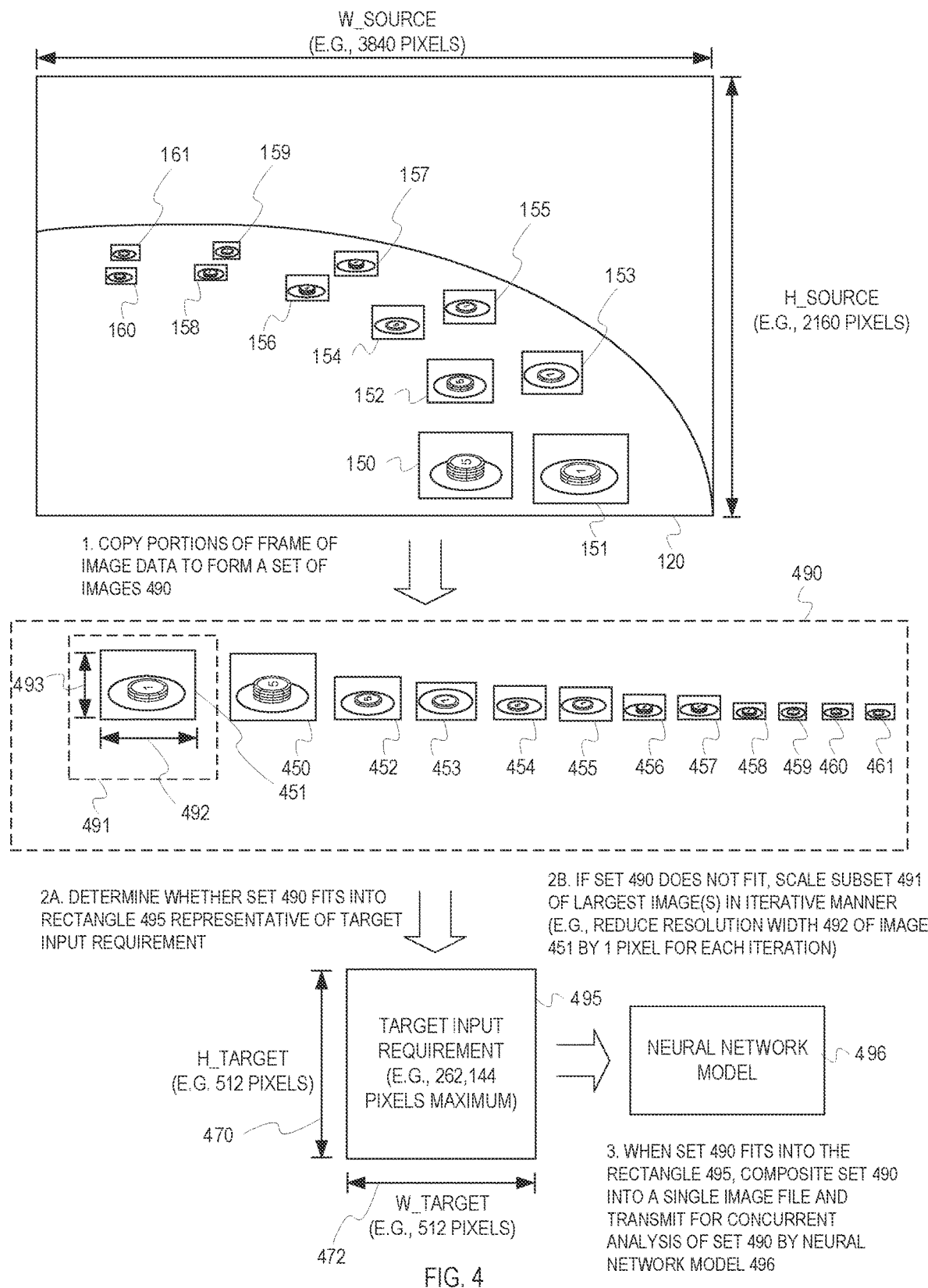

FIG. 3 is a flow diagram of an example method for gaming environment image and tracking optimization according to one or more embodiments of the present disclosure. FIG. 4 and FIG. 5 are diagrams associated with the data flow shown in FIG. 3 according to one or more embodiments of the present disclosure. FIG. 4 and FIG. 5 will be referenced in the description of FIG. 3.

In FIG. 3, a flow 300 begins at processing block 302 with receiving a frame of image data captured by a camera at a gaming table. For instance, as shown in FIG. 1, the camera 130 captured the frame of image data 120 using image capture settings for the camera 130, In another example, a video stream of image data is captured by a camera and is sent to a tracking controller (e.g., tracking controller 204 shown in FIG. 2) for image processing and/or analysis to identify physical objects in the gaming area.

In some embodiments, the image capture settings may include, but are not limited to, one or more of the following:
  A setting for a picture resolution at which the image data is captured. In some instances, a level of the picture resolution depends on a level of detail needed by a neural network model to identify physical objects within an area of interest based on game state.
  A setting for an aspect ratio.
  A setting for a shutter speed. Some shutter speeds are optimal for physical objects that may move quickly. For example, during some game states, the gaming system tracks players' hands. Because hands can move quickly, taking pictures of hands at higher shutter speeds reduces or eliminates possible blurring that can appear on the frame of image data because of the quick hand movement. Some shutter speeds may be optimal based on ambient light settings. For instance, some game states that require precise tracking of object features or that require identification of details of the physical characteristics of the objects may include settings that allow for longer exposure times so that more detail can be captured in the source image.
  A setting for an aperture size.
  A zoom setting. For example, some game states may be relevant to only a certain portion or portions of the gaming area. Thus, some image capture settings may be set to zoom in or out on specific area in the image feed from the camera,
  A setting that references a template name for a set of overlay rectangles. The set of overlay rectangles can be positioned over one or more specific areas on a frame of image data captured from the camera at the gaming table (e.g. see FIG. 1). In some instances, the setting specifies a name of a template from a library of image capture settings. For instance, FIG. 5 illustrates an example library 501 that a gaming system can utilize to automatically, and dynamically, select image capture settings at a gaming table based, at least in part, on a specific game state (or combination of game states or other gaming conditions). For instance, the gaming system can detect that a first game state 503 (e.g., a betting mode) occurs at a gaming table. Consequently, the gaming system selects, from the library 501, a template 505 that corresponds to the first game state 503. Rectangles of different types, and at different locations, can exist for different areas of a frame of image data. For example, for a second game state 510 (e.g., a main play mode), the gaming system can select a template 512 that has rectangles associated with areas where game play activities occur, such as dealing of cards. In another example, for a third game state 520 (e.g., a bonus play or "gesturing" mode) the gaming system can select a template 522 covering an area located in a lower third of a frame of image data where the gaming system would need to detect performance of certain hand gestures or to track game play elements, such as cards, a roulette wheel, dice, etc. For a fourth game state 530 (e.g., a services mode), the gaming system can select a template 533 that covers almost all areas. In addition, the library 501 also specifies camera settings that would be optimal for capturing images of certain types of activity and/or for certain types of objects being tracked for particular game state purposes. Some camera settings may need a higher resolution and a longer exposure time (e.g., such as for tracking gaming tokens during a betting mode), whereas others may need a lower resolution with a short exposure time (e.g., such as for tracking hands during gesturing mode).

Referring back to FIG. 3, the flow 300 continues at processing block 304 with generating a set of images from portions of the frame of image data. In one example, a gaming system generates the set of images by automatically selecting and using one or more overlay rectangles from a library of templates as described previously. For example, a gaming system determines that a game state is a betting mode, thus selects the overlay template 505 from library 501. As shown in FIG. 4, the gaming system automatically superimposes rectangles 150-161 stored in the overlay template 505. The gaming system then copies portions of the image data that correspond to the set of areas associated with the rectangles 150-161 (e.g., copying/cropping the portions of the image data within the areas of the frame over which the boundaries of the rectangles 150-161 are superimposed). The gaming system then stores the copied portions as a set of images 490 (e.g. in a memory buffer, in an array, in a database, etc.). Each of the plurality of copies has a respective image width and image height according to an image resolution for the frame of image data 120.

In some examples, the gaming system can assign a unique identifier from each of the rectangles 150-161 to each respective one of the images 450-461 contained within the set of images 490. The identifier can be used to identify where the images 450-461 are in relation to each other and in relation to boundaries of the frame of the image data 120. The identifier can also be used to identify each of the images 450-461 if modified or to track the images 450-461 when they are organized into a unit (e.g., into a texture atlas or sprite sheet).

Referring back to FIG. 3, the flow 300 continues at processing block 306 with determining whether the set of images meets an input requirement of a neural network model. If the set of images fails to meet the input requirement, the flow 300 continues at processing block 308 with modifying, by an incremental amount, an image property of a subset of the set of images. For instance, referring to FIG. 4, the gaming system determines whether the set of images 490 fit into the area of the rectangle 495 just as they were generated when copied from the frame of image data 120. The gaming system can determine whether the set of images 190 fit by running a packing algorithm on the set of images 490 to determine whether all of the images 450-461 (at their given size based on the resolution from the frame of image data 120) will fit into rectangle 495. The area of rectangle 495 is equal to a product of the target height 470 (e.g., 512 pixels) multiplied by a target width 472 (e.g., 512 pixels), resulting in a maximum input area (e.g., 262,144 pixels).

An example of source code for a packing algorithm according to some embodiments includes the Rectangle Packer Demo by Ville Koskela, at https://github.com/villekoselaorg/RectanglePacking/blob/master/src/org/villekoske/Rectangle PackerDemo.as, which is incorporated herein by reference in its entirety.

In some embodiments, the gaming system can determine whether the set of images 490 meet the input requirement by determining an exact size for all of the images 450-461, then running a packing algorithm using the exact size values. However, in another example, as a time saving measure, the gaming system can perform a quick check to determine whether the set of images 490 collectively meet the input requirement. For instance, the gaming system can multiply a value of the largest side of the largest rectangle in the set of images 490 (e.g., the width 492) by itself and by a total number of the members of the set of images 490. The product is a maximum possible area of all of the set of images 490. For instance, if the width 492 of image 451 (the largest image) is two hundred (200) pixels, the gaming system can multiply that value by itself (e.g., the product of 200 pixels×200 pixels=40,000 pixels). Next, the gaming system multiplies the value of that product (e.g., 40,000 pixels) by the number twelve (i.e., the number of images in the set of images 490 is twelve). Thus, the maximum possible area of all of the set of images 490 is 40,000 pixels×12=480,000 pixels. Because this number (480,000 pixels) is greater than the maximum target input value (greater than 262,144 pixels), then the gaming system determines that the set of images 490 would not fit into rectangle 495 without overlapping each other. At that point, the gaming system may then run a more precise packing algorithm using exact values of height and width for each of the set of images 490.

Still referring to FIG. 4, in some embodiments, the gaming system modifies the set of images 490 locally (e.g., by a first processor located at the gaming table as opposed to a second processor for a second device (e.g., a server) at a remote location for the neural network model).

In some instances, the gaming system selects one or more of the images 450-461 that has a highest image quality value amongst the set of images 490, such as determining which of the images 450-461 has an image resolution width that is largest in size amongst themselves. For example, the gaming system measures the width of each of the images 450-461 and determines that image 451 has the largest width 492. Thus, image 451 is placed into a subset 491.

In other instances, the gaming system selects, as the subset, only those images from the set of images 490 that most require modification (e.g., images that require size scaling, images that require contrast change, images that require sharpening, etc.) or that have the greatest tolerance for modification (e.g., larger images can be reduced in resolution and will still be recognizable by the image neural network model 496 with an acceptable level of confidence, at least as much of a chance (or more so) than the smaller images). By iteratively selecting and modifying only the images that most require modification, or that have a greatest tolerance for modification, and not modifying the other images (e.g., not modifying the images that do not require modification or that have the least tolerance for modification) ensures that the quality of other less-quality images in the set of images 490 (e.g., the smaller images, dimmer images, etc.) retain as much picture quality as possible from the raw image data captured (e.g., according to the image capture settings selected for the given game state). Thus, the gaming system can provide the neural network the best picture quality for each image in the set, therefore improving the chances that the neural network will identify and properly classify objects depicted in the set of images 490, thus increasing the precision of the gaming system to identify and classify physical objects in the gaming area relevant to the game state.

Still referring to FIG. 4, the gaming system scales each image in the subset by a specific amount. For example, the gaming system scales each of the one or more images in the subset 491 in width by a pixel width reduction value. In one example, such as in FIG. 4, the gaming system scales the image 451 such that the resolution of the image decreases in width by one pixel value for each iteration, while in other examples, the gaming system scales the image such that the resolution of the image decreases in width by a specific number of pixel values, more than one pixel value. The specific number can vary based on one or more factors such as (i) a level/degree to which the set of images 490 needs to be scaled to meet the input requirement (e.g., if a significant amount of scaling needs to be done, then the gaming system can set the pixel width reduction value to be a larger number of pixels at first (e.g., 10 pixels), and as the subset 491 is iteratively reduced in resolution, the pixel width reduction value can decrease dynamically as the resolution size of the subset 491 decreases and begins to approach the required collective resolution needed to fit the set of images 490 into the target rectangle 495, (ii) an amount of time by which the neural network model 496 needs the set of images 490 to be able to complete an electronic analysis of the set of images 490 or to complete one or more operations of the wagering game for the game state), (iii) a total number of the rectangles 450-461, (iv) the game state, and so forth.

The gaming system can further scale each of the images in the subset 491 in height by a pixel height reduction value, wherein the pixel height reduction value comprises the pixel width reduction value divided by an aspect ratio indicated in the image capture settings (to maintain the same aspect ratio of width to height specified in the webcam settings).

In some embodiments, the gaming system does not scale at least one of the set of images. For example, the gaming system scales the largest image 451, but not the smaller images 450, 452, 453, 454, 455, 456, 457, 458, 459, 460, and 461. After scaling each image in the subset 491 by the specific amount, the gaming system determines again whether the set of images 490 collectively fits into the target rectangle 495. With each repeating iteration, the gaming system reduces the largest image(s) (e.g., the one or ones in the subset 491) in an incremental manner, then runs the packing algorithm to determine whether the set of images 490 fit into the target rectangle 495.

In some instances, for each iteration, the gaming system evaluates which one(s) of the set of images 490 are largest and includes those one(s) in the subset 491 for image scaling. For instance, after one or more iterations of incremental reduction in resolution, the gaming system scales image 451 to such a degree that the width 492 becomes equal to (or less than) that of a width for image 450. Thus, for that iteration, and for any potential subsequent iterations, the gaming system includes image 450 into the subset 491 in addition to image 451.

Referring back to FIG. 3, the flow 300 continues at processing block 310 with transmitting the set of images as a unit to the neural network model when the set of images meets the input requirement. For instance, in FIG. 4, after determining that the set of images 490 fits into the rectangle 495, the gaming system packs the set of images 490 into a single image file e.g., a sprite sheet or texture atlas). The gaming system then transmits the file to the neural network model 495 to analyze the set of images 490 in the single image concurrently. This improves network bandwidth resources because the gaming system is only submitting one file over the network instead of twelve different files. Further, this improves the speed at which neural network model can analyze the set of images 490 because all images are being assessed at approximately the same time. Yet even further, this improves confidence score on average because it leaves the lowest quality images alone (e.g., keeps lowest quality images at their original quality).

FIG. 1-FIG. 5 show some example embodiments. An additional example may include a gaming system that, based on the game state, transmits the set of images to one or neural network models. In some examples, the gaming system can determine to send different sets of images (according to different types of rectangles within the image) to different neural network models and/or to send subsets of the set of images to one or more different neural network models.

In another example, the gaming system uses one or more data objects to update the set of rectangles. For example, the neural network model can analyze one of the images from the set of images and determine that a height of a chip stack is taller the height of an annotated rectangle. The neural network model detects that the chip stack is taller than the height of the annotated rectangle and provides data, regarding the actual size, as one or more data objects that are linked to the rectangle by an identifier. Upon receiving the data, the gaming system updates the size of the annotated rectangle for subsequent image use and capture.

In yet other examples, the gaming system utilizes a video camera (e.g., a webcam) that captures both visual and audio data. Prior to processing or transmitting images, the gaming system performs MJPEG compression. MJPEG compression removes any audio data, thus reducing a file size for any of the set of images. In some embodiments, the gaming system can train a neural network using images that appear to have MJPEG compression (e.g., which have compression artifacts, such as noise from a webcam image).

In some examples, the gaming system determines, based on a game state, whether to send the packed file to a local neural network model (e.g., stored on hardware at the gaming table) versus a neural network on a remote neural network model (e.g., stored on hardware on a remote server accessible via the internet). In some embodiments, the gaming system can train a neural network model with image blur on hands resulting in better results for classification.

In yet other examples, the gaming system can train a neural network model to identify chip stacks only if the bottom chip in the stack is within the betting circle. For instance, one of the set of images may depict a chip behind a betting circle, yet which is still within the area depicted in the image. Consequently, if the neural network model is trained to only identify objects of a certain type (e.g., chip shaped objects), it might identify the stray chip(s) as being included as a bet. However, to prevent this from happening, the neural network model is trained that, as a condition of identification, the bottom chip in a stack must be inside the betting circle. Thus, the stray chip(s) are not considered to be part of the bet.

Figure 6:
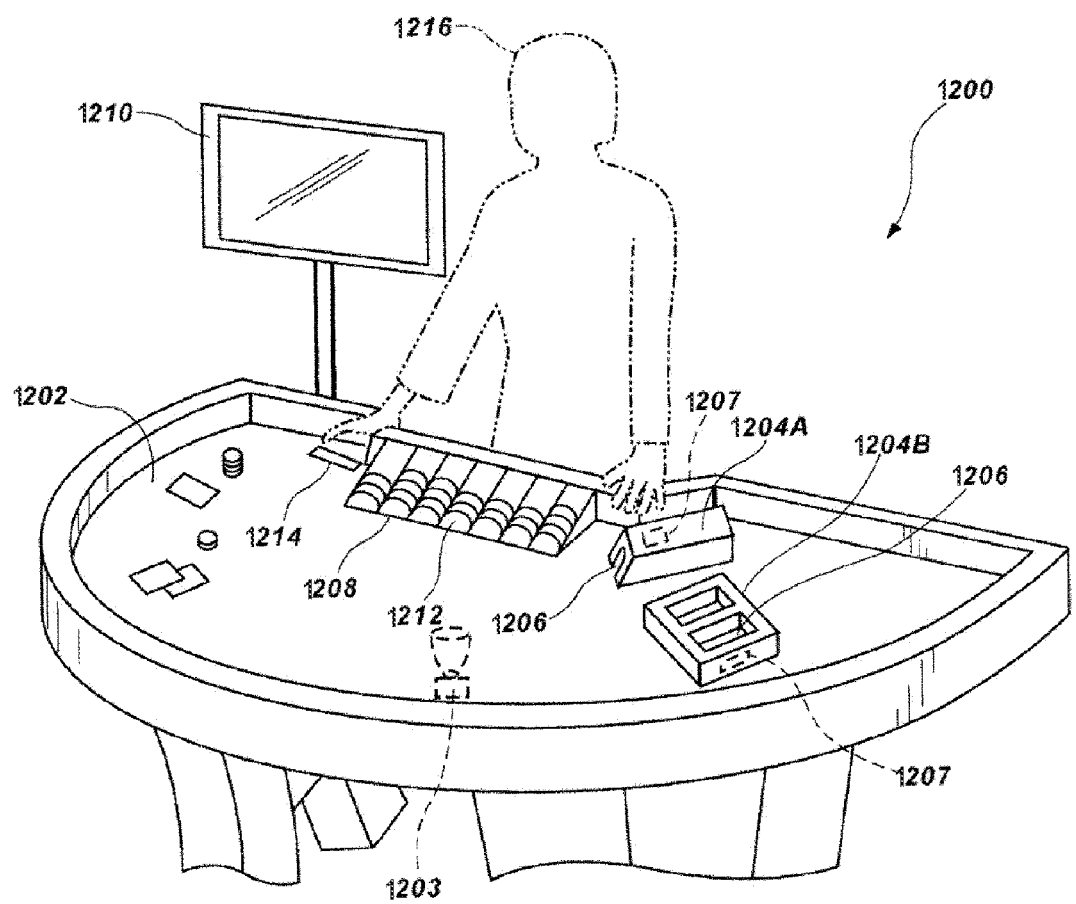
FIG. 6 is a perspective view of a gaming table configured for implementation of embodiments of wagering games in accordance with this disclosure.

FIG. 6 is a perspective view of an embodiment of a gaming table 1200 (which may be configured as the gaming table 140 of FIG. 1) for implementing wagering games in accordance with this disclosure. The gaming table 1200 may be a physical article of furniture around which participants in the wagering game may stand or sit and on which the physical objects used for administering and otherwise participating in the wagering game may be supported, positioned, moved, transferred, and otherwise manipulated. For example, the gaming table 1200 may include a gaming surface 1202 (e.g., a table surfaces) on which the physical objects used in administering the wagering game may be located. The gaming surface 1202 may be, for example, a felt fabric covering a hard surface of the table, and a design, conventionally referred to as a "layout," specific to the game being administered may be physically printed on the gaming surface 1202. As another example, the gaming surface 1202 may be a surface of a transparent or translucent material (e.g., glass or plexiglass) onto which a projector 1203, which may be located, for example, above or below the gaming surface 1202, may illuminate a layout specific to the wagering game being administered. In such an example, the specific layout projected onto the gaming surface 1202 may be changeable, enabling the gaming table 1200 to be used to administer different variations of wagering games within the scope of this disclosure or other wagering games. In either example, the gaming surface 1202 may include, for example, designated areas for player positions; areas in which one or more of player cards, dealer cards, or community cards may be dealt; areas in which wagers may be accepted; areas in which wagers may be grouped into pots; and areas in which rules, pay tables, and other instructions related to the wagering game may be displayed. As a specific, nonlimiting example, the gaming surface 1202 may be configured as any table surface described herein.

In some embodiments, the gaming table 1200 may include a display 1210 separate from the gaming surface 1202. The display 1210 may be configured to face players, prospective players, and spectators and may display; for example, information randomly selected by a shuffler device and also displayed on a display of the shuffler device; rules; pay tables; real-time game status, such as wagers accepted and cards dealt; historical game information, such as amounts won, amounts wagered, percentage of hands won, and notable hands achieved; the commercial game name, the casino name, advertising and other instructions and information related to the wagering game. The display 1210 may be a physically fixed display, such as an edge lit sign, in some embodiments. In other embodiments, the display 1210 may change automatically in response to a stimulus (e.g., may be an electronic video monitor).

The gaming table 1200 may include particular machines and apparatuses configured to facilitate the administration of the wagering game. For example, the gaming table 1200 may include one or more card-handling devices 1204A, 1204B. The card-handling device 1204A may be, for example, a shoe from which physical cards 1206 from one or more decks of intermixed playing cards may be withdrawn, one at a time. Such a card-handling device 1204A may include, for example, a housing in which cards 1206 are located, an opening from which cards 1206 are removed, and a card-presenting mechanism (e.g., a moving weight on a ramp configured to push a stack of cards down the ramp) configured to continually present new cards 1206 for withdrawal from the shoe.

In some embodiments in which the card-handling device 1204A is used, the card-handling device 1204A may include a random number generator and a display, in addition to or rather than such features being included in a shuffler device. In addition to the card-handling device 1204A, the card-handling device 1204B may be included. The card-handling device 1204B may be, for example, a shuffler configured to select information (using a random number generator), to display the selected information on a display of the shuffler, to reorder (either randomly or pseudo-randomly) physical playing cards 1206 from one or more decks of playing cards, and to present randomized cards 1206 for use in the wagering game. Such a card-handling device 1204B may include, for example, a housing, a shuffling mechanism configured to shuffle cards, and card inputs and outputs (e.g., trays). Shufflers may include card recognition capability that can form a randomly ordered set of cards within the shuffler. The card-handling device 1204 may also be, for example, a combination shuffler and shoe in which the output for the shuffler is a shoe.

In some embodiments, a card-handling device (e.g., card-handling device 1204A or card-handling device 1204B) may be configured and programmed to administer at least a portion of a wagering game being played utilizing the card-handling device. For example, the card-handling device may be programmed and configured to randomize a set of cards and deliver cards individually for use according to game rules and player and or dealer game play elections. More specifically, the card-handling device may be programmed and configured to, for example, randomize a set of six complete decks of cards including one or more standard 52-card decks of playing cards and, optionally, any specialty cards (e.g., a cut card, bonus cards, wild cards, or other specialty cards). In some embodiments, the card-handling device may present individual cards, one at a time, for withdrawal from the card-handling device. In other embodiments, the card-handling device may present an entire shuffled block of cards that are transferred manually or automatically into a card dispensing shoe 1204. In some such embodiments, the card-handling device may accept dealer input, such as, for example, a number of replacement cards for discarded cards, a number of hit cards to add, or a number of partial hands to be completed. In other embodiments, the device may accept a dealer input from a menu of game options indicating a game selection, which will select programming to cause the card-handling device to deliver the requisite number of cards to the game according to game rules, player decisions and dealer decisions. In still other embodiments, the card-handling device may present the complete set of randomized cards for manual or automatic withdrawal from a shuffler and then insertion into a shoe. As specific, non-limiting examples, the card-handling device may present a complete set of cards to be manually or automatically transferred into a card dispensing shoe, or may provide, a continuous supply of individual cards.

In another embodiment, the card handling device may be a batch shuffler, such as by randomizing a set of cards using a gripping, lifting, and insertion sequence.

In some embodiments, the card-handling device may employ a random number generator device to determine card order, such as, for example, a final card order or an order of insertion of cards into a compartment configured to form a packet of cards. The compartments may be sequentially numbered, and a random number assigned to each compartment number prior to delivery of the first card. In other embodiments, the random number generator may select a location in the stack of cards to separate the stack into two sub-stacks, creating an insertion point within the stack at a random location. The next card may be inserted into the insertion point, in yet other embodiments, the random number generator may randomly select a location in a stack to randomly remove cards by activating an ejector.

Regardless of whether the random number generator (or generators) is hardware or software, it may be used to implement specific game administrations methods of the present disclosure.

The card-handling device may simply be supported on the gaming surface 1202 in some embodiments. In other embodiments, the card-handling device may be mounted into the gaming table 1202 such that the card-handling device is not manually removable from the gaming table 1202 without the use of tools. In some embodiments, the deck or decks of playing cards used may be standard, 52-card decks. In other embodiments, the deck or decks used may include cards, such as, for example, jokers, wild cards, bonus cards, etc. The shuffler may also be configured to handle and dispense security cards, such as cut cards.

In some embodiments, the card-handling device may include an electronic display 1207 for displaying information related to the wagering game being administered. The electronic display 1207 may display a menu of game options, the name of the game selected, the number of cards per hand to be dispensed, acceptable amounts for other wagers (e.g., maximums and minimums), numbers of cards to be dealt to recipients, locations of particular recipients for particular cards, winning and losing wagers, pay tables, winning hands, losing hands, and payout amounts. In other embodiments, information related to the wagering game may be displayed on another electronic display, such as, for example, the display 1210 described previously.

The type of card-handling device employed to administer embodiments of the disclosed wagering game, as well as the type of card deck employed and the number of decks, may be specific to the game to be implemented. Cards used in games of this disclosure may be, for example, standard playing cards from one or more decks, each deck having cards of four suits (clubs, hearts, diamonds, and spades) and of rankings ace, king, queen, jack, and ten through two in descending order. As a more specific example, six, seven, or eight standard decks of such cards may be intermixed. Typically, six or eight decks of 52 standard playing cards each may be intermixed and formed into a set to administer a blackjack or blackjack variant game. After shuffling, the randomized set may be transferred into another portion of the card-handling deviceB or another card-handling device altogether, such as a mechanized shoe capable of reading card rank and suit.

The gaming table 1200 may include one or more chip racks 1208 configured to facilitate accepting wagers, transferring lost wagers to the house, and exchanging monetary value for wagering elements 1212 (e.g., chips), For example, the chip rack 1208 may include a series of token support rows, each of which may support tokens of a different type (e.g., color and denomination). In some embodiments, the chip rack 1208 may be configured to automatically present a selected number of chips using a chip-cutting-and-delivery mechanism. In some embodiments, the gaming table 1200 may include a drop box 1214 for money that is accepted in exchange for wagering elements or chips 1212. The drop box 1214 may be, for example, a secure container (e.g., a safe or lockbox) having a one-way opening into which money may be inserted and a secure, lockable opening from which money may be retrieved. Such drop boxes 1214 are known in the art, and may be incorporated directly into the gaming table 1200 and may, in some embodiments, have a removable container for the retrieval of money in a separate, secure location.

When administering a wagering game in accordance with embodiments of this disclosure, a dealer 1216 may receive money (e.g., cash) from a player in exchange for wagering elements 1212. The dealer 1216 may deposit the money in the drop box 1214 and transfer physical wagering elements 1212 to the player. As part of the method of administering the game, the dealer 1216 may accept one or more initial wagers from the player, which may be reflected by the dealer 1216 permitting the player to place one or more wagering elements 1212 or other wagering tokens (e.g. cash) within designated areas on the gaming surface 1202 associated with the various wagers of the wagering game. Once initial wagers have been accepted, the dealer 1216 may remove physical cards 1206 from the card-handling device (e.g., individual cards, packets of cards, or the complete set of cards) in some embodiments. In other embodiments, the physical cards 1206 may be hand-pitched (i.e., the dealer 1216 may optionally shuffle the cards 1206 to randomize the set and may hand-deal cards 1206 from the randomized set of cards). The dealer 1216 may position cards 1206 within designated areas on the gaming surface 1202, which may designate the cards 1206 for use as individual player cards, community cards, or dealer cards in accordance with game rules. House rules may require the dealer to accept both main and secondary wagers before card distribution, House rules may alternatively allow the player to place only one wager (i.e., the second wager) during card distribution and after the initial wagers have been placed, or after card distribution but before all cards available for play are revealed.

In some embodiments, after dealing the cards 1206, and during play, according to the game rules, any additional wagers (e.g., the play wager) may be accepted, which may be reflected by the dealer 1216 permitting the player to place one or more wagering elements 1212 within the designated area on the gaming surface 1202 associated with the play wager of the wagering game. The dealer 1216 may perform any additional card dealing according to the game rules. Finally the dealer 1216 may resolve the wagers, award winning wagers to the players, which may be accomplished by giving wagering elements 1212 from the chip rack 1208 to the players, and transferring losing wagers to the house, which may be accomplished by moving wagering elements 1212 from the player designated wagering areas to the chip rack 1208.

Figure 7:
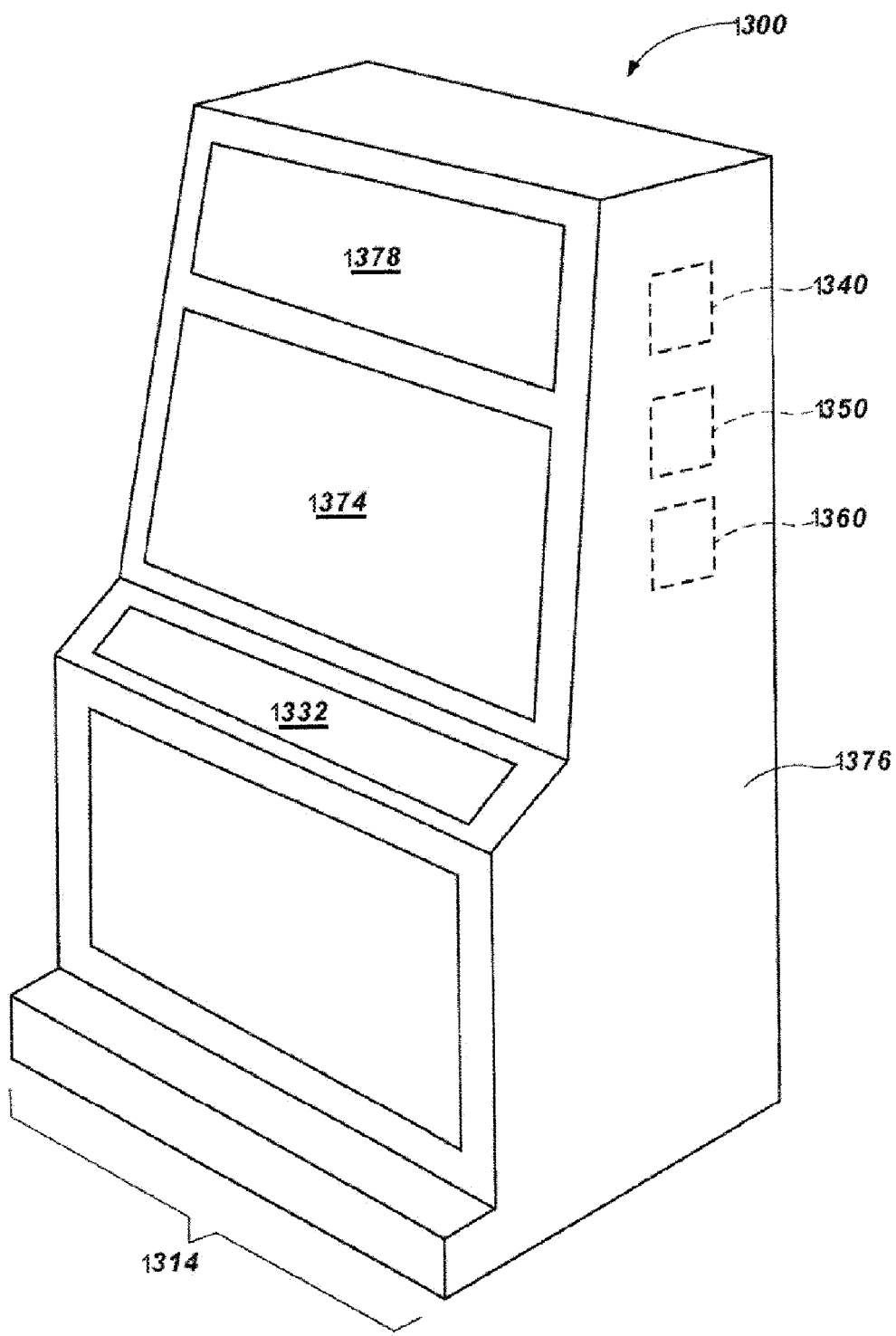
FIG. 7 is a perspective view of an individual electronic gaming device configured for implementation of embodiments of wagering games in accordance with this disclosure.

FIG. 7 is a perspective view of an individual electronic gaming device 1300 (e.g., an electronic gaming machine (EGM)) configured for implementing wagering games according to this disclosure. The individual electronic gaming device 1300 may include an individual player position 1314 including a player input area 1332 configured to enable a player to interact with the individual electronic gaming device 1300 through various input devices (e.g., buttons, levers, touchscreens). The player input area 1332 may further includes a cash- or ticket-in receptor, by which cash or a monetary-valued ticket may be fed, by the player, to the individual electronic gaming device 1300, which may then detect, in association with game-logic circuitry in the individual electronic gaming device 1300, the physical item (cash or ticket) associated with the monetary value and then establish a credit balance for the player. In other embodiments, the individual electronic gaming device 1300 detects a signal indicating an electronic wager was made. Wagers may then be received, and covered by the credit balance, upon the player using the player input area 1332 or elsewhere on the machine (such as through a touch screen). Won payouts and pushed or returned wagers may be reflected in the credit balance at the end of the round, the credit balance being increased to reflect won payouts and pushed or returned wagers and/or decreased to reflect lost wagers.

The individual electronic gaming device 1300 may further include, in the individual player position 1312, a ticket-out printer or monetary dispenser through which a payout from the credit balance may be distributed to the player upon receipt of a cashout instruction, input by the player using the player input area 1332.

The individual electronic gaming device 1300 may include a gaming screen 1374 configured to display indicia for interacting with the individual electronic gaming device 1300, such as through processing one or more programs stored in game-logic circuitry providing memory 1340 to implement the rules of game play at the individual electronic gaming device 1300, Accordingly, in some embodiments, game play may be accommodated without involving physical playing cards, chips or other wagering elements, and live personnel. The action may instead be simulated by a control processor 1350 operably coupled to the memory 1340 and interacting with and controlling the individual electronic gaming device 1300. For example, the processor may cause the display 1374 to display cards, including virtual player and virtual dealer cards for playing games of the present disclosure.

Although the individual electronic gaming device 1300, as illustrated, has an outline of a traditional gaming cabinet, the individual electronic gaming device 1300 may be implemented in other ways, such as, for example, on a bartop gaming terminal, through client software downloaded to a portable device, such as a smart phone, tablet, or laptop computer. The individual electronic gaming device 1300 may also be a non-portable personal computer (e.g., a desktop or all-in-one computer) or other computing device. In some embodiments, client software is not downloaded but is native to the device or is otherwise delivered with the device when distributed. In such embodiments, the credit balance may be established by receiving payment via credit card or player's account information input into the system by the player. Cashouts of the credit balance may be allotted to a player's account or card.

A communication device 1360 may be included and operably coupled to the processor 1350 such that information related to operation of the individual electronic gaming device 1300, information related to the game play, or combinations thereof may be communicated between the individual electronic gaming device 1300 and other devices, such as a server, through a suitable communication medium, such, as, for example, wired networks, Wi-Fi networks, and cellular communication networks.

The gaming screen 1374 may be carried by a generally vertically extending cabinet 1376 of the individual electronic gaming device 1300. The individual electronic gaming device 1300 may further include banners to communicate rules of game play, instructions, game play advice or hints and the like, such as along a top portion 1378 of the cabinet 1376 of the individual electronic gaining gaming device 1300. The individual electronic gaming device 1300 may further include additional decorative lights (not shown), and speakers (not shown) for transmitting and optionally receiving sounds during game play.

Some embodiments may be implemented at locations including a plurality of player stations. Such player stations may include an electronic display screen for display of game information (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

Figure 8:
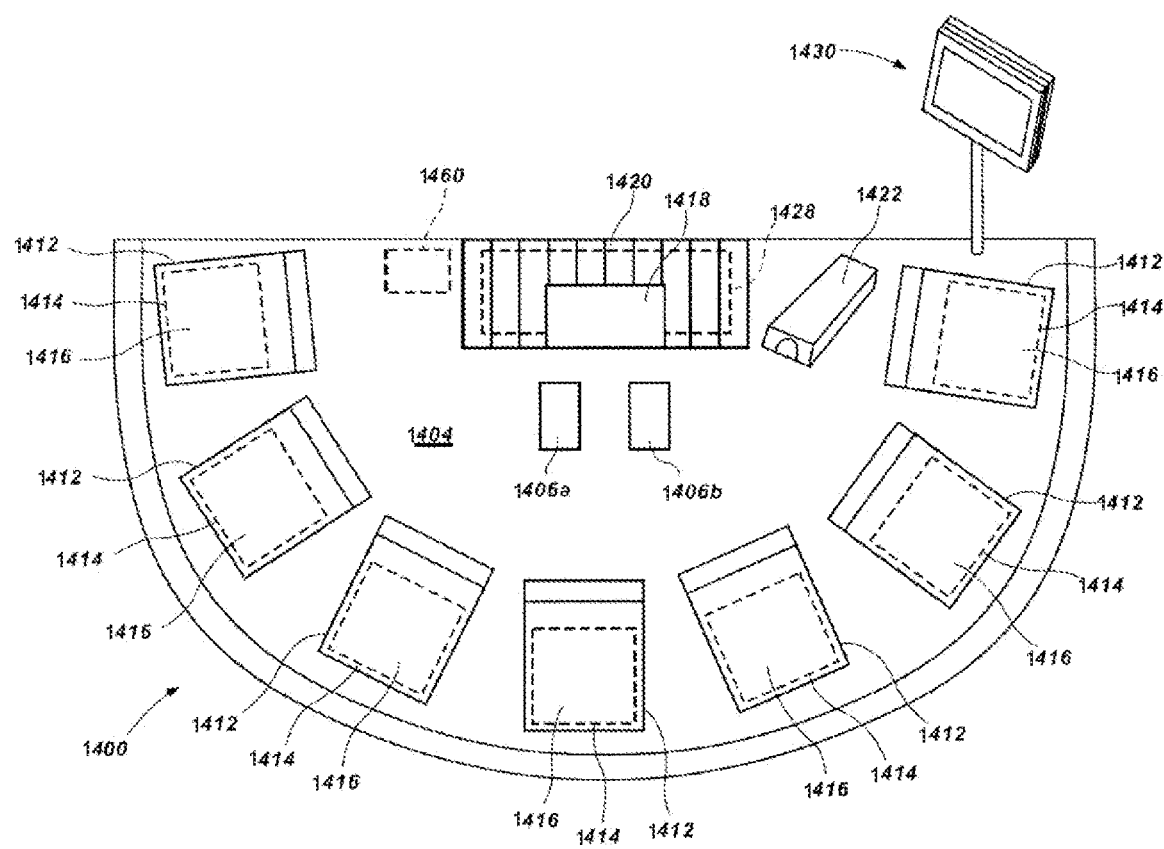
FIG. 8 is a top view of a table configured for implementation of embodiments of wagering games in accordance with this disclosure.

FIG. 8 is a top view of a suitable table 1400 configured for implementing wagering games according to this disclosure. The table 1400 may include a playing surface 1404. The table 1400 may include electronic player stations 1412. Each player station 1412 may include a player interface 1416, which may be used for displaying game information (e.g., graphics illustrating a player layout, game instructions, input options, wager information, game outcomes, etc.) and accepting player elections. The player interface 1416 may be a display screen in the form of a touch screen, which may be at least substantially flush with the playing surface 1404 in some embodiments. Each player interface 1416 may be operated by its own local game processor 1414 (shown in dashed lines), although, in some embodiments, a central game processor 1428 (shown in dashed lines) may be employed and may communicate directly with player interfaces 1416. In some embodiments, a combination of individual local game processors 1414 and the central game processor 1428 may be employed. Each of the processors 1414 and 1428 may be operably coupled to memory including one or more programs related to the rules of game play at the table 1400.

A communication device 1460 may be included and may be operably coupled to one or more of the local game processors 1414, the central game processor 1428, or combinations thereof, such that information related to operation of the table 1400, information related to the game play, or combinations thereof may be communicated between the table 1400 and other devices through a suitable communication medium, such as, for example, wired networks, Wi-Fi networks, and cellular communication networks.

The table 1400 may further include additional features, such as a dealer chip tray 1420, which may be used by the dealer to cash players in and out of the wagering game, whereas wagers and balance adjustments during game play may be performed using, for example, virtual chips (e.g., images or text representing wagers). For embodiments using physical cards 1406a and 1406b, the table 1400 may further include a card-handling device 1422 such as a card shoe configured to read and deliver cards that have already been randomized. For embodiments using virtual cards, the virtual cards may be displayed at the individual player interfaces 1416. Physical playing cards designated as "common cards" may be displayed in a common card area.

The table 1400 may further include a dealer interface 1418, which, like the player interfaces 1416, may include touch screen controls for receiving dealer inputs and assisting the dealer in administering the wagering game. The table 1400 may further include an upright display 1430 configured to display images that depict game information, pay tables, hand counts, historical win/loss information by player, and a wide variety of other information considered useful to the players. The upright display 1430 may be double sided to provide such information to players as well as to casino personnel.

Although an embodiment is described showing individual discrete player stations, in some embodiments, the entire playing surface 1404 may be an electronic display that is logically partitioned to permit game play from a plurality of players for receiving inputs from, and displaying game information to, the players, the dealer, or both.

Figure 9:
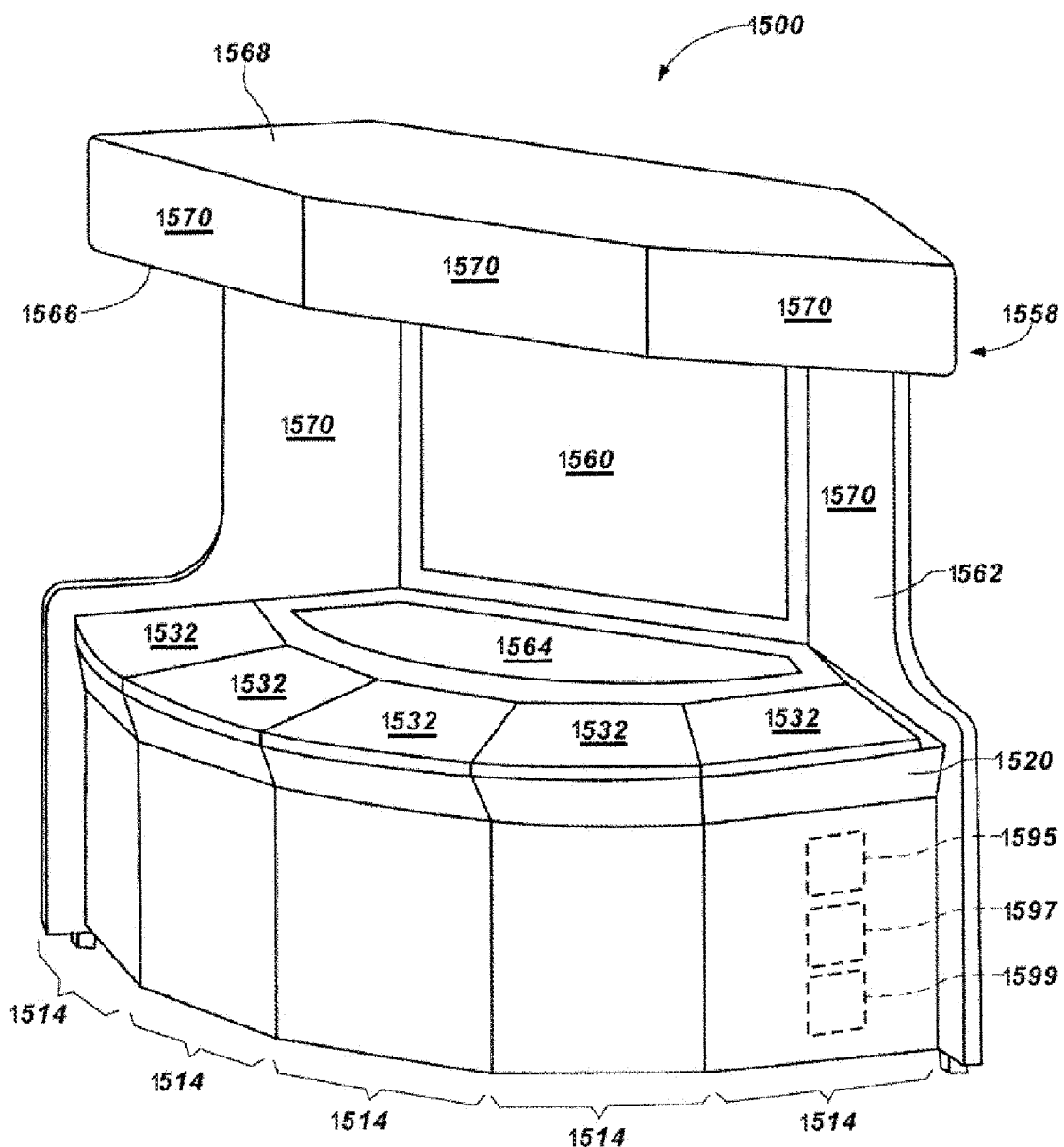
FIG. 9 is a perspective view of another embodiment of a table configured for implementation of embodiments of wagering games in accordance with this disclosure, wherein the implementation includes a virtual dealer.

FIG. 9 is a perspective view of another embodiment of a suitable electronic multi-player table 1500 configured for implementing wagering games according to the present disclosure utilizing a virtual dealer. The table 1500 may include player positions 1514 arranged in a bank about an arcuate edge 1520 of a video device 1558 that may comprise a card screen 1564 and a virtual dealer screen 1560. The dealer screen 1560 may display a video simulation of the dealer (i.e., a virtual dealer) for interacting with the video device 1558, such as through processing one or more stored programs stored in memory 1595 to implement the rules of game play at the video device 1558. The dealer screen 1560 may be carried by a generally vertically extending cabinet 1562 of the video device 1558. The substantially horizontal card screen 1564 may be configured to display at least one or more of the dealer's cards, any community cards, and each player's cards dealt by the virtual dealer on the dealer screen 1560.

Each of the player positions 1514 may include a player interface area 1532 configured for wagering and game play interactions with the video device 1558 and virtual dealer. Accordingly, game play may be accommodated without involving physical playing cards, poker chips, and live personnel. The action may instead be simulated by a control processor 1597 interacting with and controlling the video device 1558. The control processor 1597 may be programmed, by known techniques, to implement the rules of game play at the video device 1558. As such, the control processor 1597 may interact and communicate with display/input interfaces and data entry inputs for each player interface area 1532 of the video device 1558. Other embodiments of tables and gaming devices may include a control processor that may be similarly adapted to the specific configuration of its associated device.

A communication device 1599 may be included and operably coupled to the control processor 1597 such that information related to operation of the table 1500, information related to the game play, or combinations thereof may be communicated between the table 1500 and other devices, such as a central server, through a suitable communication medium, such, as, for example, wired networks, Wi-Fi networks, and cellular communication networks.

The video device 1558 may further include banners communicating rules of play and the like, which may be located along one or more walls 1570 of the cabinet 1562. The video device 1558 may further include additional decorative lights and speakers, which may be located on an underside surface 1566, for example, of a generally horizontally extending top 1568 of the cabinet 1562 of the video device 1558 generally extending toward the player positions 1514.

Although an embodiment is described showing individual discrete player stations, in some embodiments, the entire playing surface (e.g., player interface areas 1532, card screen 1564, etc. may be a unitary electronic display that is logically partitioned to permit game play from a plurality of players for receiving inputs from, and displaying game information to, the players, the dealer, or both.

Figure 10:
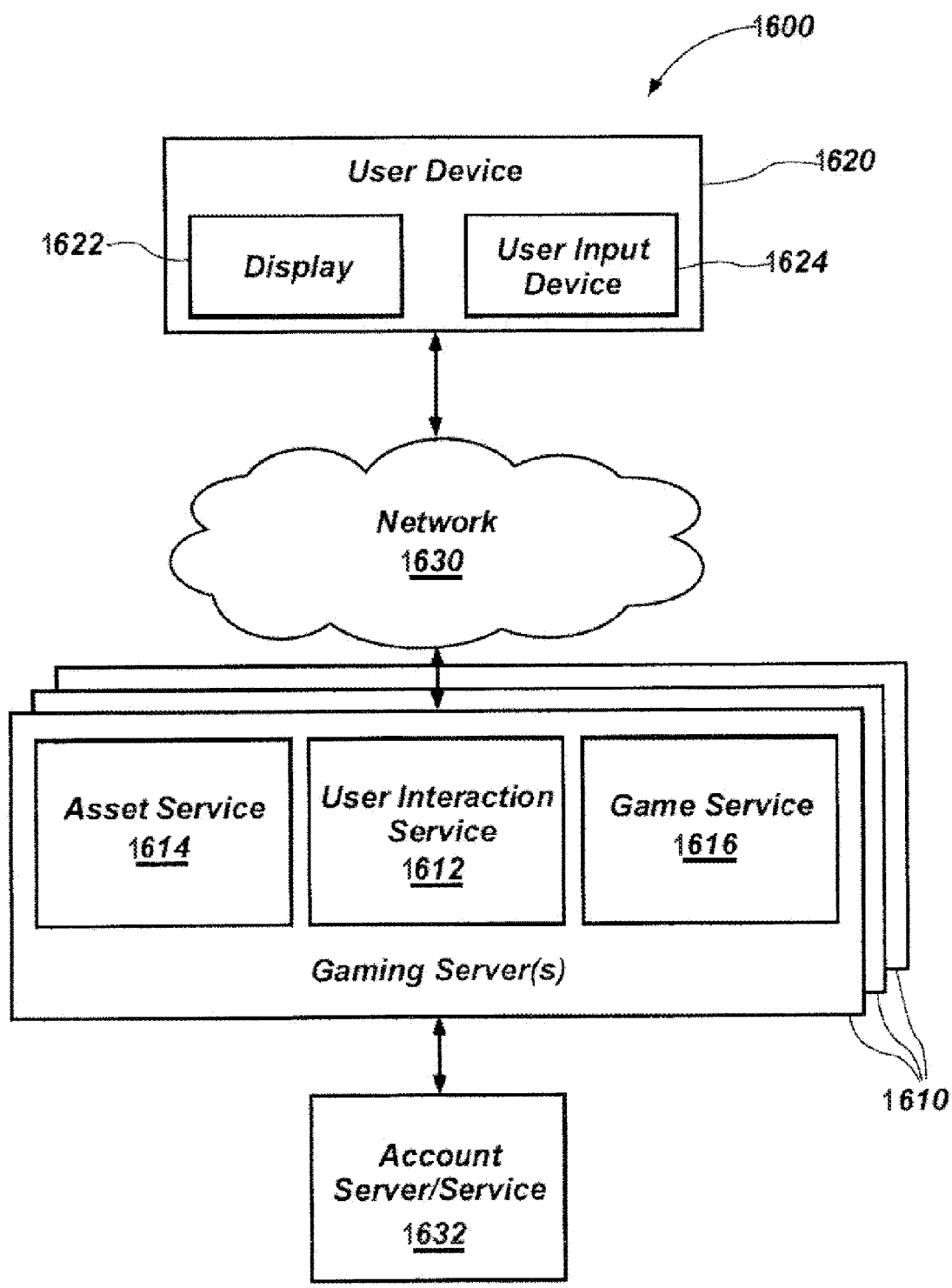
FIG. 10 is a schematic block diagram of a gaming system for implementing embodiments of wagering games in accordance with this disclosure.

In some embodiments, wagering games in accordance with this disclosure may be administered using a gaming system employing a client-server architecture (e.g., over the Internet, a local area network, etc.). FIG. 10 is a schematic block diagram of an illustrative gaming system 1600 for implementing wagering games according to this disclosure. The gaming system 1600 may enable end users to remotely access game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not limited to, Class II and Class III games as defined under 25 U.S.C. § 2701 et seq. ("Indian Gaming Regulatory Act"). Such games may include banked and/or non-banked games.

The wagering games supported by the gaming system 1600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits Or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1600 may include a gaming platform to establish a portal for an end user to access a wagering game hosted by one or more gaming servers 1610 over a network 1630. In some embodiments, games are accessed through a user interaction service 1612. The gaming system 1600 enables players to interact with a user device 1620 through a user input device 1624 and a display 1622 and to communicate with one or more gaming servers 1610 using a network 1630 (e.g., the Internet). Typically, the user device is remote from the gaming server 1610 and the network is the world-wide web (i.e., the Internet).

In some embodiments, the gaming servers 1610 may be configured as a single server to administer wagering games in combination with the user device 1620. In other embodiments, the gaming servers 1610 may be configured as separate servers for performing separate, dedicated functions associated with administering wagering games. Accordingly, the following description also discusses "services" with the understanding that the various services may be performed by different servers or combinations of servers in different embodiments. As shown in FIG. 9, the gaming servers 1610 may include a user interaction service 1612, a game service 1616, and an asset service 1614. In some embodiments, one or more of the gaming servers 1610 may communicate with an account server 1632 performing an account service 1632. As explained more fully below, for some wagering type games, the account service 1632 may be separate and operated by a different entity than the gaming servers 1610; however, in some embodiments the account service 1632 may also be operated by one or more of the gaming servers 1610.

The user device 1620 may communicate with the user interaction service 1612 through the network 1630. The user interaction service 1612 may communicate with the game service 1616 and provide game information to the user device 1620. In some embodiments, the game service 1616 may also include a game engine. The game engine may, for example, access, interpret, and apply game rules. In some embodiments, a single user device 1620 communicates with a game provided by the game service 1616, while other embodiments may include a plurality of user devices 1620 configured to communicate and provide end users with access to the same game provided by the game service 1616. In addition, a plurality of end users may be permitted to access a single user interaction service 1612, or a plurality of user interaction services 1612, to access the game service 1616, The user interaction service 1612 may enable a user to create and access a user account and interact with game service 1616. The user interaction service 1612 may enable users to initiate new games, join existing games, and interface with games being played by the user.

The user interaction service 1612 may also provide a client for execution on the user device 1620 for accessing the gaming servers 1610. The client provided by the gaming servers 1610 for execution on the user device 1620 may be any of a variety of implementations depending on the user device 1620 and method of communication with the gaming servers 1610, In one embodiment, the user device 1620 may connect to the gaming servers 1610 using a web browser, and the client may execute within a browser window or frame of the web browser. In another embodiment, the client may be a stand-alone executable on the user device 1620.

For example, the client may comprise a relatively small amount of script (e.g., JAVASCRIPT®), also referred to as a "script driver," including scripting language that controls an interface of the client. The script driver may include simple function calls requesting information from the gaming servers 1610. In other words, the script driver stored in the client may merely include calls to functions that are externally defined by, and executed by, the gaming servers 1610. As a result, the client may be characterized as a "thin client." The client may simply send requests to the gaming servers 1610 rather than performing logic itself. The client may receive player inputs, and the player inputs may be passed to the gaming servers 1610 for processing and executing the wagering game. In some embodiments, this may involve providing specific graphical display information for the display 1622 as well as game outcomes.

As another example, the client may comprise an executable file rather than a script. The client may do more local processing than does a script driver, such as calculating where to show what game symbols upon receiving a game outcome from the game service 1616 through user interaction service 1612. In some embodiments, portions of an asset service 1614 may be loaded onto the client and may be used by the client in processing and updating graphical displays. Some form of data protection, such as end-to-end encryption, may be used when data is transported over the network 1630. The network 1630 may be any network, such as, for example, the Internet or a local area network.

The gaming servers 1610 may include an asset service 1614, which may host various media assets (e.g., text, audio, video, and image files) to send to the user device 1620 for presenting the various wagering games to the end user. In other words, the assets presented to the end user may be stored separately from the user device 1620. For example, the user device 1620 requests the assets appropriate for the game played by the user; as another example, especially relating to thin clients, just those assets that are needed for a particular display event will be sent by the gaming servers 1610, including as few as one asset. The user device 1620 may call a function defined at the user interaction service 1612 or asset service 1614, which may determine which assets are to be delivered to the user device 1620 as well as how the assets are to be presented by the user device 1620 to the end user. Different assets may correspond to the various user devices 1620 and their clients that may have access to the game service 1616 and to different variations of wagering games.

The gaming servers 1610 may include the game service 1616, which may be programmed to administer wagering games and determine game play outcomes to provide to the user interaction service 1612 for transmission to the user device 1620. For example, the game service 1616 may include game rules for one or more wagering games, such that the game service 1616 controls some or all of the game flow for a selected wagering game as well as the determined game outcomes. The game service 1616 may include pay tables and other game logic. The game service 1616 may perform random number generation for determining random game elements of the wagering game. In one embodiment, the game service 1616 may be separated from the user interaction service 1612 by a firewall or other method of preventing unauthorized access to the game service 1612 by the general members of the network 1630.

The user device 1620 may present a gaming interface to the player and communicate the user interaction from the user input device 1624 to the gaming servers 1610. The user device 1620 may be any electronic system capable of displaying gaming information, receiving user input, and communicating the user input to the gaming servers 1610. For example, the user device 1620 may be a desktop computer, a laptop, a tablet computer, a set-top box, a mobile device (e.g., a smartphone), a kiosk, a terminal, or another computing device. As a specific, nonlimiting example, the user device 1620 operating the client may be an interactive electronic gaming system 1300. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 1610. The client may be illustrated within a casino webpage (or other interface) indicating that the client is embedded into a webpage, which is supported by a web browser executing on the user device 1620.

In some embodiments, components of the gaming system 1600 may be operated by different entities. For example, the user device 1620 may be operated by a third party, such as a casino or an individual, that links to the gaming servers 1610, which may be operated, for example, by a wagering game service provider. Therefore, in some embodiments, the user device 1620 and client may be operated by a different administrator than the operator of the game service 1616. In other words, the user device 1620 may be part of a third-party system that does not administer or otherwise control the gaming servers 1610 or game service 1616. In other embodiments, the user interaction service 1612 and asset service 1614 may be operated by a third-party system. For example, a gaming entity (e.g., a casino) may operate the user interaction service 1612, user device 1620, or combination thereof to provide its customers access to game content managed by a different entity that may control the game service 1616, amongst other functionality. In still other embodiments, all functions may be operated by the same administrator. For example, a gaming entity (e.g., a casino) may elect to perform each of these functions in-house, such as providing access to the user device 1620, delivering the actual game content, and administering the gaming system 1600.

The gaming servers 1610 may communicate with one or more external account servers 1632 (also referred to herein as an account service 1632), optionally through another firewall. For example, the gaming servers 1610 may not directly accept wagers or issue payouts. That is, the gaming servers 1610 may facilitate online casino gaming but may not be part of self-contained online casino itself. Another entity (e.g., a casino or any account holder or financial system of record) may operate and maintain its external account service 1632 to accept bets and make payout distributions. The gaming servers 1610 may communicate with the account service 1632 to verify the existence of funds for wagering and to instruct the account service 1632 to execute debits and credits. As another example, the gaming servers 1610 may directly accept bets and make payout distributions, such as in the case where an administrator of the gaming servers 1610 operates as a casino.

Additional features may be supported by the gaming servers 1610, such as hacking and cheating detection, data storage and archival, metrics generation, messages generation, output formatting for different end user devices, as well as other features and operations.

Figure 11:
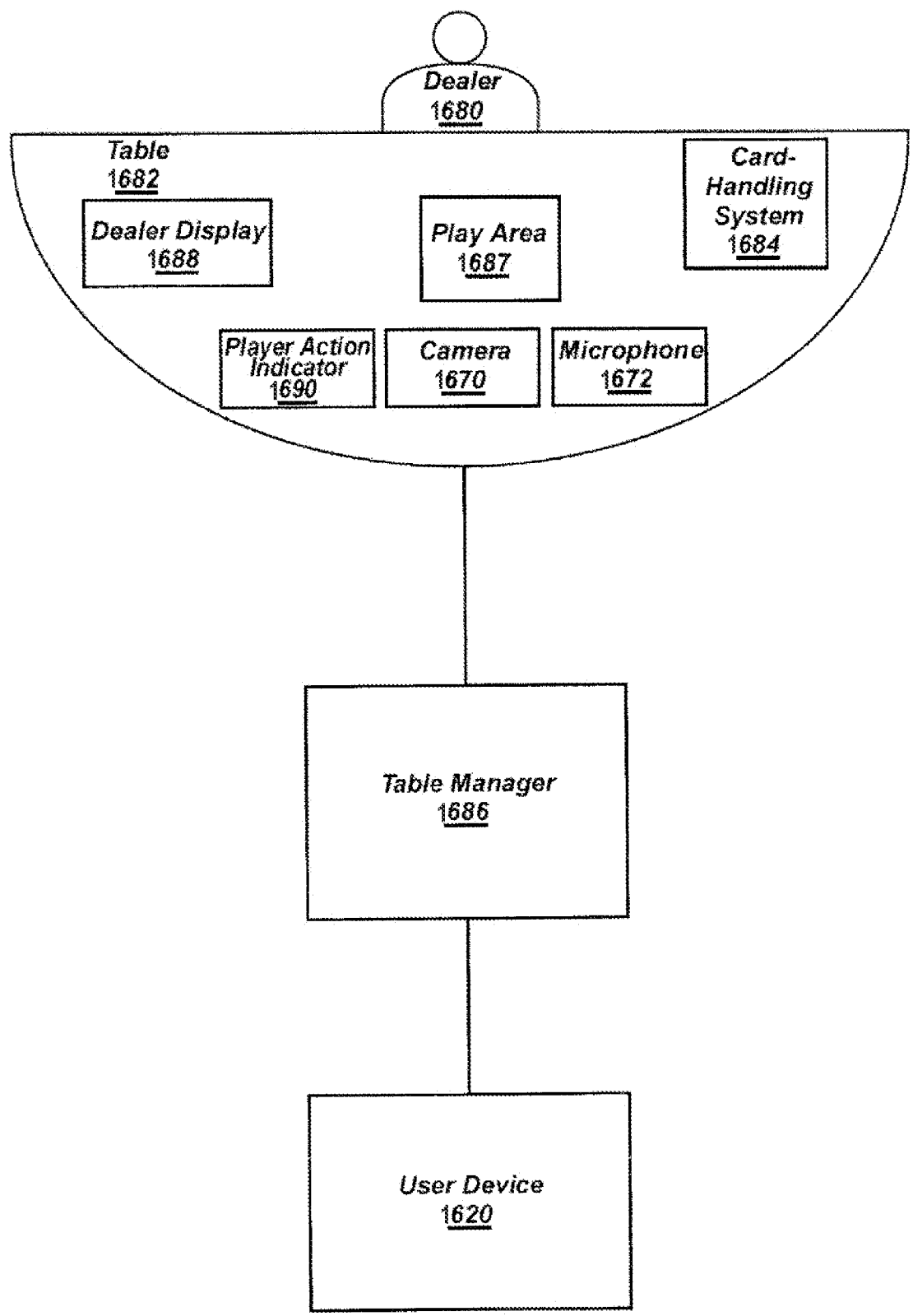
FIG. 11 is a schematic block diagram of a gaming system for implementing embodiments of wagering games including a live dealer feed.

FIG. 11 is a schematic block diagram of a table 1682 for implementing wagering games including a live dealer video feed. Features of the gaming system 1600 (described previously) may be utilized in connection with this embodiment, except as further described. Rather than cards being determined by computerized random processes, physical cards (e.g., from a standard, 52-card deck of playing cards) may be dealt by a live dealer 1680 at a table 1682 from a card-handling system 1684 located in a studio or on a casino floor. A table manager 1686 may assist the dealer 1680 in facilitating play of the game by transmitting a live video feed of the dealer's actions to the user device 1620 and transmitting remote player elections to the dealer 1680. As described above, the table manager 1686 may act as or communicate with a gaming system 1600 (e.g., acting as the gaming system 1600 itself or as an intermediate client interposed between and operationally connected to the user device 1620 and the gaming system 1600) to provide gaming at the table 1682 to users of the gaming system 1600. Thus, the table manager 1686 may communicate with the user device 1620 through a network 1630, and may be a part of a larger online casino, or may be operated as a separate system facilitating game play. In various embodiments, each table 1682 may be managed by an individual table manager 1686 constituting a gaming device, which may receive and process information relating to that table. For simplicity of description, these functions are described as being performed by the table manager 1686, though certain functions may be performed by an intermediary gaming system. In some embodiments, the gaming system 1600 may match remotely located players to tables 1682 and facilitate transfer of information between user devices 1620 and tables 1682, such as wagering amounts and player option elections, without managing gameplay at individual tables. In other embodiments, functions of the table manager 1686 may be incorporated into a gaming system 1600.

The table 1682 includes a camera 1670 and optionally a microphone 1672 to capture video and audio feeds relating to the table 1682. The camera 1670 may be trained on the live dealer 1680, play area 1687, and card-handling system 1684. As the game is administered by the live dealer 1680, the video feed captured by the camera 1670 may be shown to the player remotely using the user device 1620, and any audio captured by the microphone 1672 may be played to the player remotely using the user device 1620. In some embodiments, the user device 1620 may also include a camera, microphone, or both, which may also capture feeds to be shared with the dealer 1680 and other players. In some embodiments, the camera 1670 may be trained to capture images of the card faces, chips, and chip stacks on the surface of the gaming table. Known image extraction techniques may be used to obtain card count and card rank and suit information from the card images.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example. Examples of card data include, for example, suit and rank information of a card, suit and rank information of each card in a hand, rank information of a hand, and rank information of every hand in a round of play.

The live video feed permits the dealer to show cards dealt by the card-handling system 1684 and play the game as though the player were at a gaming table, playing with other players in a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

The card-handling system 1684 may be as shown and was described previously. The play area 1686 depicts player layouts for playing the game. As determined by the rules of the game, the player at the user device 1620 may be presented options for responding to an event in the game using a client.

Player elections may be transmitted to the table manager 1686, which may display player elections to the dealer 1680 using a dealer display 1688 and player action indicator 1690 on the table 1682. For example, the dealer display 1688 may display information regarding where to deal the next card or which player position is responsible for the next action.

In some embodiments, the table manager 1686 may receive card information from the card-handling system 1684 to identify cards dealt by the card-handling system 1684. For example, the card-handling system 1684 may include a card reader to determine card information from the cards. The card information may include the rank and suit of each dealt card and hand information.

The table manager 1686 may apply game rules to the card information, along with the accepted player decisions, to determine gameplay events and wager results. Alternatively, the wager results may be determined by the dealer 1680 and input to the table manager 1686, which may be used to confirm automatically determined results by the gaming system.

Card and wager data in some embodiments may be used by the table manager 1686 to determine game outcome. The data extracted from the camera 1670 may be used to confirm the card data obtained from the card-handling system 1684, to determine a player position that received a card, and for general security monitoring purposes, such as detecting player or dealer card switching, for example.

The live video teed permits the dealer to show cards dealt by the card-handling system 1684 and play the game as though the player were at a live casino. In addition, the dealer can prompt a user by announcing a player's election is to be performed. In embodiments where a microphone 1672 is included, the dealer 1680 can verbally announce action or request an election by a player. In some embodiments, the user device 1620 also includes a camera or microphone, which also captures feeds to be shared with the dealer 1680 and other players.

Figure 12:
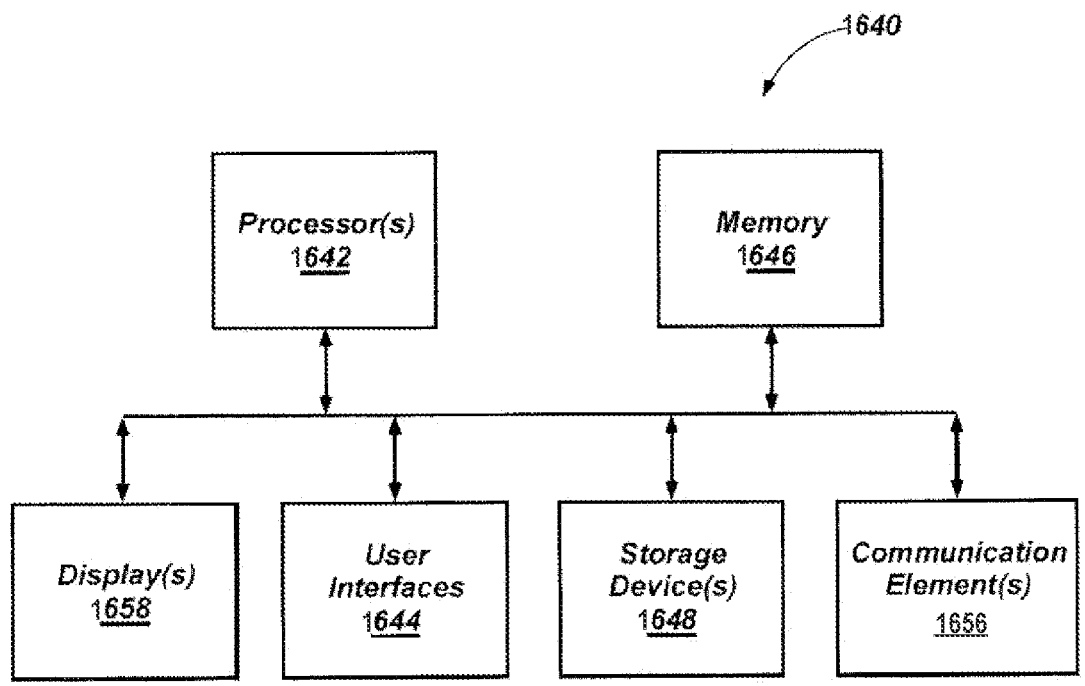
FIG. 12 is a block diagram of a computer for acting as a gaming system for implementing embodiments of wagering games in accordance with this disclosure.

FIG. 12 is a simplified block diagram showing elements of computing devices that may be used in systems and apparatuses of this disclosure. A computing system 1640 may be a user-type computer, a file server, a computer server, a notebook computer, a tablet, a handheld device, a mobile device, or other similar computer system for executing software. The computing system 1640 may be configured to execute software programs containing computing instructions and may include one or more processors 1642, memory 1646, one or more displays 1658, one or more user interface elements 1644, one or more communication elements 1656, and one or more storage devices 1648 (also referred to herein simply as storage 1648).

The processors 1642 may be configured to execute a wide variety of operating systems and applications including the computing instructions for administering wagering games of the present disclosure.

The processors 1642 may be configured as a general-purpose processor such as a microprocessor, but in the alternative, the general-purpose processor may be any processor, controller, microcontroller, or state machine suitable for carrying out processes of the present disclosure. The processor 1642 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The memory 1646 may be used to hold computing instructions, data, and other information for performing a wide variety of tasks including administering wagering games of the present disclosure. By way of example, and not limitation, the memory 1646 may include Synchronous Random Access Memory (SRAM), Dynamic RAM (DRAM), Read-Only Memory (ROM), Flash memory, and the like.

The display 1658 may be a wide variety of displays such as, for example, light-emitting diode displays, liquid crystal displays, cathode ray tubes, and the like. In addition, the display 1658 may be configured with a touch-screen feature for accepting user input as a user interface element 1644.

As nonlimiting examples, the user interface elements 1644 may include elements such as displays, keyboards, push-buttons, mice, joysticks, haptic devices, microphones, speakers, cameras, and touchscreens.

As nonlimiting examples, the communication elements 1656 may be configured for communicating with other devices or communication networks. As nonlimiting examples, the communication elements 1656 may include elements for communicating on wired and wireless communication media, such as for example, serial ports, parallel ports, Ethernet connections, universal serial bus (USB) connections, IEEE 1394 ("firewire") connections. THUNDERBOLT™ connections, BLUETOOTH® wireless networks, ZigBee wireless networks, 802.11 type wireless networks, cellular telephone/data networks, fiber optic networks and other suitable communication interfaces and protocols.

The storage 1648 may be used for storing relatively large amounts of nonvolatile information for use in the computing system 1640 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 1640 may be configured in many different ways with different types of interconnecting buses between the various elements. Moreover, the various elements may be subdivided physically, functionally, or a combination thereof. As one nonlimiting example, the memory 1646 may be divided into cache memory, graphics memory, and main memory. Each of these memories may communicate directly or indirectly with the one or more processors 1642 on separate buses, partially combined buses, or a common bus.

As a specific, nonlimiting example, various methods and features of the present disclosure may be implemented in a mobile, remote, or mobile and remote environment over one or more of Internet, cellular communication (e.g., Broadband), near field communication networks and other communication networks referred to collectively herein as an iGaming environment. The iGaming environment may be accessed through social media environments such as FACE-BOOK® and the like. DragonPlay Ltd, acquired by Bally Technologies Inc., provides an example of a platform to provide games to user devices, such as cellular telephones and other devices utilizing ANDROID®, iPHONE® and FACEBOOK® platforms. Where permitted by jurisdiction, the iGaming environment can include pay-to-play (P2P) gaming where a player, from their device, can make value based wagers and receive value based awards. Where P2P is not permitted the features can be expressed as entertainment only gaming where players wager virtual credits having no value or risk no wager whatsoever such as playing a promotion game or feature.

Figure 13:
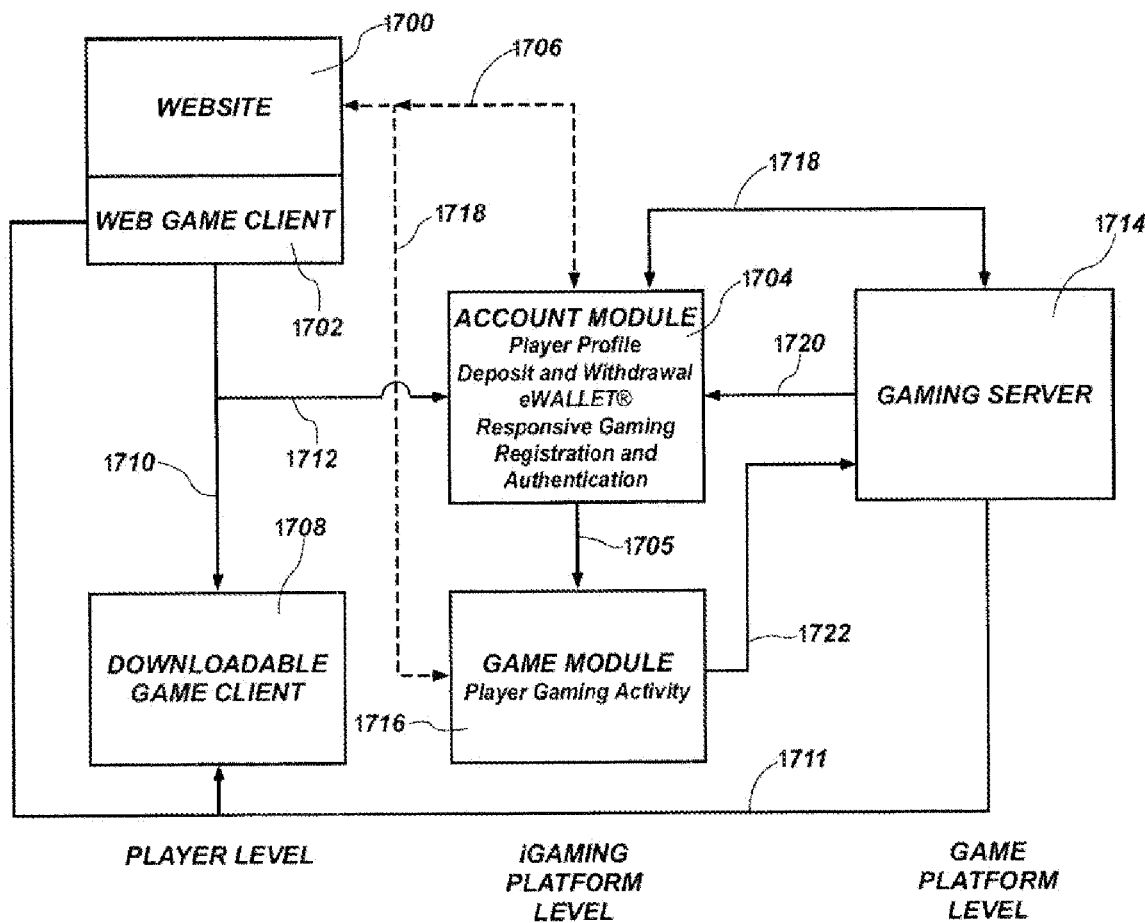
FIG. 13 illustrates an embodiment of data flows between various applications/services for supporting the game, feature or utility of the present disclosure for mobile/interactive gaming.

FIG. 13 illustrates an illustrative embodiment of information flows in an iGaming environment. At a player level, the player or user accesses a site hosting the activity such as a website 1700. The website 1700 may functionally provide a web game client 1702. The web game client 1702 may be, for example, represented by a game client 1708 downloadable at information flow 1710, which may process applets transmitted from a gaming server 1714 at information flow 1711 for rendering and processing game play at a player's remote device. Where the game is a P2P game, the gaming server 1714 may process value-based wagers (e.g., money wagers) and randomly generate an outcome for rendition at the player's device. In some embodiments, the web game client 1702 may access a local memory store to drive the graphic display at the player's device. In other embodiments, all or a portion of the game graphics may be streamed to the player's device with the web game client 1702 enabling player interaction and display of game features and outcomes at the player's device.

The website 1700 may access a player-centric, raining-platform-level account module 1704 at information flow 1706 for the player to establish and confirm credentials for play and, where permitted, access an account (e.g., an eWallet) for wagering. The account module 1704 may include or access data related to the player's profile (e.g., player-centric information desired to be retained and tracked by the host), the player's electronic account, deposit, and withdrawal records, registration and authentication information, such as username and password, name and address information, date of birth, a copy of a government issued identification document, such as a driver's license or passport, and biometric identification criteria, such as fingerprint or facial recognition data, and a responsible gaming module containing information, such as self-imposed or jurisdictionally imposed gaming restraints, such as loss limits, daily limits and duration limits. The account module 1704 may also contain and enforce geo-location limits, such as geographic areas where the player may play P2P games, user device IP address confirmation, and the like.

The account module 1704 communicates at information flow 1705 with a game module 1716 to complete log-ins, registrations, and other activities. The game module 1716 may also store or access a player's gaming history, such as player tracking and loyalty club account information. The game module 1716 may provide static web pages to the player's device from the game module 1716 through information flow 1718, whereas, as stated above, the live game content may be provided from the gaming server 1714 to the web game client through information flow 1711.

The gaming server 1714 may be configured to provide interaction between the game and the player, such as receiving wager information, game selection, inter-game player selections or choices to play a game to its conclusion, and the random selection of game outcomes and graphics packages, which, alone or in conjunction with the downloadable game client 1708/web game client 1702 and game module 1716, provide for the display of game graphics and player interactive interfaces. At information flow 1718, player account and log-in information may be provided to the gaming server 1714 from the account module 1704 to enable gaming. Information flow 1720 provides wager/credit information between the account module 1704 and gaming server 1714 for the play of the game and may display credits and eWallet availability. Information flow 1722 may provide player tracking information for the gaming server 1714 for tracking the player's play. The tracking of play may be used for purposes of providing loyalty rewards to a player, determining preferences, and the like.

All or portions of the features of FIG. 13 may be supported by servers and databases located remotely from a player's mobile device and may be hosted or sponsored by regulated gaming entity for P2P gaming or, where P2P is not permitted, for entertainment only play.

In some embodiments, wagering games may be administered in an at least partially player-pooled format, with payouts on pooled wagers being paid from a pot to players and losses on wagers being collected into the pot and eventually distributed to one or more players. Such player-pooled embodiments may include a player-pooled progressive embodiment, in which a pot is eventually distributed when a predetermined progressive-winning hand combination or composition is dealt. Player-pooled embodiments may also include a dividend refund embodiment, in which at least a portion of the pot is eventually distributed in the form of a refund distributed, e.g., pro-rata, to the players who contributed to the pot.

In some player-pooled embodiments, the game administrator may not obtain profits from chance-based events occurring in the wagering games that result in lost wagers. Instead, lost wagers may be redistributed back to the players. To profit from the wagering game, the game administrator may retain a commission, such as, for example, a player entrance fee or a rake taken on wagers, such that the amount obtained by the game administrator in exchange for hosting the wagering game is limited to the commission and is not based on the chance events occurring in the wagering game itself. The game administrator may also charge a rent of flat fee to participate.

It is noted that the methods described herein can be played with any number of standard decks of 52 cards (e.g., 1 deck to 10 decks). A standard deck is a collection of cards comprising an Ace, two, three, four, five, six, seven, eight, nine, ten, jack, queen, king, for each of four suits (comprising spades, diamonds, dubs, hearts) totaling 52 cards. Cards can be shuffled or a continuous shuffling machine (CSM) can be used. A standard deck of 52 cards can be used, as well as other kinds of decks, such as Spanish decks, decks with wild cards, etc. The operations described herein can be performed in any sensible order. Furthermore, numerous different variants of house rules can be applied.

Note that in the embodiments played using computers (a processor/processing unit), "virtual deck(s)" of cards are used instead of physical decks. A virtual deck is an electronic data structure used to represent a physical deck of cards which uses electronic representations for each respective card in the deck. In some embodiments, a virtual card is presented (e.g., displayed on an electronic output device using computer graphics, projected onto a surface of a physical table using a video projector, etc.) and is presented to mimic a real life image of that card.

Methods described herein can also be played on a physical table using physical cards and physical chips used to place wagers. Such physical chips can be directly redeemable for cash. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, features, etc. of a game being played can be communicated to the player (e.g., verbally or on a written rule card) before the game begins.

Initial cash deposits can be made into the electronic gaming machine which converts cash into electronic credits. Wagers can be placed in the form of electronic credits, which can be cashed out for real coins or a ticket (e.g., ticket-in-ticket-out) which can be redeemed at a casino cashier or kiosk for real cash and/or coins.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A method of operating a wagering game system comprising a gaming table and a camera, said method comprising:
   detecting, by an electronic processor in response to electronic communication with the wagering game system, a game state from a plurality of game states associated with a wagering game presented at the gaming table;
   dynamically generating, by the electronic processor based, at least in part on the detected game state, a set of digital images from portions of a frame of image data captured by the camera at the gaming table;
   in response to determining, by the electronic processor via electronic analysis of the set of digital images, that the set of images fails a maximum resolution target input requirement for a neural network model that corresponds to the game state, iteratively modifying, by the electronic processor, an image resolution property of a subset of images from the set of images until the iteratively modifying causes the set of digital images to collectively meet the maximum resolution target input requirement, wherein the iteratively modifying comprises, in an iterative manner, until the set of digital images meets the maximum resolution target input requirement, selecting, as the subset of images, one or more images from the set of digital images that possess an image resolution width that is largest in size amongst all the members of the set of digital images, scaling the image resolution width of each of the one or more images by one pixel and scaling an image resolution height of each of the one or more images by one pixel divided by an aspect ratio at which the frame of image data was captured, and wherein in response to each iteration of the scaling the image resolution width and image resolution height of the one or more images, determining, by the electronic processor via a rectangle packing algorithm, whether the set of images collectively fit into a rectangle that represents a maximum resolution limit for the neural network model; and
   in response to determining that said iteratively modifying causes the set of digital images to meet the maximum resolution target input requirement, providing, by the electronic processor, the set of digital images to the neural network model.

2. The method of claim 1, said generating comprising:
   determining, by the electronic processor, a level of image detail needed by the neural network model to identify physical objects within an area of interest at the gaming table;
   automatically selecting, by the electronic processor in response to determining the level of detail, one or more image capture settings associated with the camera based, at least in part, on the detected game state and the level of image detail; and
   capturing the frame of image data using the one or more image capture settings.

3. The method of claim 2, wherein the image capture settings comprise one or more of an image resolution setting, an aspect ratio setting, a shutter speed setting, an aperture size setting, or a zoom setting.

4. The method of claim 1, wherein said generating comprises:
   determining, by the electronic processor based on the detected game state, portions of interest at the gaming table required for analysis by the neural network model;
   automatically superimposing, by the electronic processor, a set of graphical rectangles over the portions of the frame of image data, wherein the set of graphical rectangles represent locations in the frame that correspond to respective ones of the portions of interest at the gaming table required for analysis by the neural network model;

copying, by the electronic processor, the portions of the frame of image data that correspond to the set of graphical rectangles; and storing, by the electronic processor, the copied portions as the set of images, wherein each of the copied portions has a respective image width and image height according to an image resolution setting of the camera.

5. The method of claim 4, further comprising:

associating, by the electronic processor, a unique identifier from each of the set of rectangles to a corresponding one of the set of digital images, wherein the unique identifier associates each one of the set of digital images to a corresponding one of the locations in the frame that corresponds to one of the respective portions of interest at the gaming table;

compositing, by the electronic processor via a rectangle packing algorithm, the set of digital images into a sprite sheet using the unique identifier to store a position of the corresponding one of the set of digital images on the sprite sheet; and analyzing, by the electronic processor via the neural network model, the set of digital images as a unit, wherein the analyzing uses the unique identifier to identify where each of the set of digital images are in relation to each other on the sprite sheet.

6. The method of claim 4, further comprising:

receiving, in response to analysis by the neural network model, one or more data objects associated with characteristics of physical objects identified by the neural network model; and using the one or more data objects to update the set of rectangles.

7. The method of claim 1, wherein the determining whether the set of images collectively fit into the rectangle comprises:

multiplying the image resolution width by itself and by a total number of members of the set of digital images; and determining whether a product of the multiplying is less than, or equal to, an area of the rectangle, wherein the area of the rectangle is a product of multiplying a resolution height limit for the neural network model with a resolution width limit for the neural network model.

8. The method of claim 1, wherein said providing comprises:

compositing the set of digital images into a file; and transmitting the file to the neural network model to analyze the composited set of digital images concurrently as a unit.

9. A gaming system comprising
a network communication interface; and
a processor configured to perform one or more operations to
generate, based, at least in part on a game state of a wagering game, a set of images from one or more portions of a frame of image data captured by a camera at a gaming table,
in response to determination that the set of images fails a target input requirement for a neural network model that corresponds to the game state, incrementally modify an image property of a subset of images from the set of images until the set of images meets the target input requirement, wherein the processor being configured to incrementally modify the image property of the subset of images is configured to perform one or more operations to, in an iterative manner until the set of images meets the target input requirement, select, as the subset of images, one or more images from the set of images that has an image resolution width that is largest in size amongst all members of the set of images, scale an image resolution width of each of the one or more images in the subset by one pixel, scale an image resolution height of each of the one or more images in the subset by one pixel divided by an aspect ratio at which the frame of image data was captured, and determine whether the set of images collectively fit into a rectangle that represents a maximum resolution limit for the neural network model, and in response to determination that the set of images meets the target input requirement, provide the set of images to the neural network model.

10. The gaming system of claim 9, wherein the processor being configured to generate the set of images is configured to perform one or more operations to:

automatically select, based at least in part on the game state, one or more image capture settings associated with the camera; and capture the frame of image data based on the one or more image capture settings, wherein the image capture settings comprise one or more of an image resolution setting, an aspect ratio setting, a shutter speed setting, an aperture size setting, or a zoom setting.

11. The gaming system of claim 9, wherein the processor being configured to generate the set of images is configured to perform one or more operations to:

automatically superimpose a set of rectangles over the portions of the frame of image data, wherein the set of rectangles represent locations that require analysis by the neural network model;

crop the portions of the frame of image data that correspond to the set of rectangles; and store the cropped portions as the set of images, wherein each of the set of images has a respective image width and image height according to an image resolution setting of the camera.

12. The gaming system of claim 9, wherein the processor being configured to provide the set of images to the neural network model is configured to perform one or more operations to:

composite the set of images into a single image; and transmit, via the network communication interface, the single image to a device having one or more additional processors that operate the neural network model.

13. The gaming system of claim 12, wherein the processor being configured to composite the set of images into the single image is configured to perform one or more operations to associate a unique identifier from each of the set of rectangles to a corresponding one of the set of images.

14. The gaming system of claim 12, wherein the single image comprises at least one of a sprite sheet or a texture atlas.

15. The gaming system of claim 9, wherein the processor being configure to determine whether the set of images collectively fit into the rectangle is configured to perform one or more operations to run a packing algorithm on the set of images.

16. The gaming system of claim 9, wherein the processor being configure to determine whether the set of images collectively fit into the rectangle is configured to perform one or more operations to:

multiply the image resolution width by itself and by a total number of members of the set of images; and determine whether a product of the multiplying is less than, or equal to, an area of the rectangle, wherein the area of the rectangle is a product of multiplying a resolution height limit for the neural network model with a resolution width limit for the neural network model.

17. One or more non-transitory computer-readable storage media having instructions stored thereon, which, when executed by a set of one or more processors of a gaming system, cause the set of one or more processors to perform operations comprising:
generating, based at least in part on a game state of a wagering game, a set of images from portions of a frame of image data captured by a camera at a gaming table;
determining that the set of images fails to collectively fit into an area of a rectangle that represents a maximum resolution limit for a neural network model that corresponds to the game state;
in response to determining that the set of images fails to collectively fit into the rectangle,
in an iterative manner, until the set of images meets the target input requirement,
selecting, as the subset of images, one or more images from the set of images that have an image resolution width that is largest in size amongst all members of the set of images,
scaling an image resolution width of each of the one or more images in the subset by one pixel;
scaling an image resolution height of each of the one or more images in the subset by one pixel divided by an aspect ratio at which the frame of image data was captured; and
running a packing algorithm to determine whether the set of images collectively fit into a rectangle that represents a maximum resolution limit for the neural network model;
in response to determination that the set of images collectively fit into the rectangle, compositing the set of images into a single image file; and
transmitting, via a communications network, the single image file to the neural network model for concurrent analysis of the set of images contained within the single image file.

* * * * *